(12) United States Patent
Kamiyama et al.

(10) Patent No.: US 7,051,766 B2
(45) Date of Patent: May 30, 2006

(54) PIPE LINER BAG EVERTING NOZZLE AND PIPE LINING METHOD

(76) Inventors: Takao Kamiyama, 17-2, Toyohara-cho, Hiratsuka-shi (JP); Yasuhiro Yokoshima, 175-3 Ooaza-Shinoyama, Ishige-cho, Yuki-gun (JP); Shigeru Endoh, 856, Ooaza-Miyagasaki, Yasato-machi, Niihari-gun (JP); Hiroyuki Aoki, 1-194-4, Hayashi, Tokorozawa-shi (JP)

( * ) Notice: Subject to any disclaimer, the term of this patent is extended or adjusted under 35 U.S.C. 154(b) by 392 days.

(21) Appl. No.: 10/658,497

(22) Filed: Sep. 9, 2003

(65) Prior Publication Data

US 2004/0045617 A1    Mar. 11, 2004

Related U.S. Application Data

(62) Division of application No. 09/858,803, filed on May 16, 2001, now Pat. No. 6,631,739.

(30) Foreign Application Priority Data

May 18, 2000 (JP) .............................. 2000-146136

(51) Int. Cl.
*F16L 55/16* (2006.01)

(52) U.S. Cl. .......................................... 138/98; 138/97

(58) Field of Classification Search ................. 138/97, 138/98
See application file for complete search history.

(56) References Cited

U.S. PATENT DOCUMENTS

| | | | |
|---|---|---|---|
| 2,794,758 A | 6/1957 | Harper et al. | |
| 4,064,211 A | 12/1977 | Wood | |
| 4,334,943 A | 6/1982 | Zenbayashi et al. | |
| 4,724,108 A | 2/1988 | Jurgenlohmann et al. | |
| 5,223,204 A | 6/1993 | Endoh | |
| 5,329,063 A | 7/1994 | Endoh | |
| 5,451,284 A | 9/1995 | Ikeda et al. | |
| 5,454,401 A * | 10/1995 | Kamiyama et al. | ........... 138/98 |
| 5,520,484 A | 5/1996 | Kamiyama et al. | |
| 5,700,110 A | 12/1997 | Kamiyama et al. | |
| 6,006,787 A | 12/1999 | Kamiyama et al. | |
| 6,024,910 A | 2/2000 | Kamiyama et al. | |
| 6,152,184 A | 11/2000 | Kamiyama et al. | |
| 6,270,289 B1 | 8/2001 | Einhaus et al. | |
| 6,484,757 B1 | 11/2002 | Warren | |
| 6,631,739 B1 * | 10/2003 | Kamiyama et al. | ........... 138/98 |

* cited by examiner

*Primary Examiner*—James Hook
(74) *Attorney, Agent, or Firm*—Knobbe, Martens, Olson & Bear, LLP

(57) ABSTRACT

A pipe liner bag everting nozzle is provided for allowing an operator to freely access a manhole during a lining operation. A pipe liner bag everting nozzle comprises a guide tube fixing end for fixing one end of a guide tube, and a pipe liner bag fixing end for fixing a folded end of an uneverted pipe liner bag passed through the guide tube, wherein the guide tube fixing end has a diameter smaller than a diameter of the pipe liner bag fixing end. Since a guide tube having a smaller diameter than that of a pipe line to be repaired (or the pipe liner bag) can be used, a sufficient gap is formed between the guide tube and the manhole, thereby allowing the operator to freely access the manhole during the lining operation for inspection and confirmation of a lining situation.

6 Claims, 22 Drawing Sheets

PIPE LINER BAG EVERTING NOZZLE AND PIPE LINING METHOD

PRIORITY INFORMATION

This application is a divisional application of U.S. patent application Ser. No. 09/858,803 filed May 16, 2001, now U.S. Pat. No. 6,631,739, the entire contents of which is hereby expressly incorporated by reference and also claims priority to Japanese Application No. 2000-146136 filed May 18, 2000, the entire contents of which is hereby expressly incorporated by reference.

BACKGROUND OF THE INVENTION

1. Field of the Invention

The present invention relates generally to manhole lining techniques, and more particularly to a pipe liner bag everting nozzle and a pipe lining method using the same.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. The pipe lining method utilizes a tubular pipe liner bag made of a resin absorbent material impregnated with a hardenable resin, and having the outer surface covered with a highly air-tight plastic film. The tubular pipe liner bag is inserted into a pipe to be repaired by means of a pressurized fluid such that the pipe liner bag is turned inside out as it proceeds deeper in the pipe. Hereinafter, this manner of insertion shall be called "everting". When the entire length of the tubular liner bag is everted (i.e., turned inside out) into the pipe, the everted tubular liner is pressed against the inner wall of the pipe by a pressurized fluid, and the tubular flexible liner is hardened as the hardenable resin impregnated in the liner is heated, which is effected by heating the fluid filling the tubular liner bag. It is thus possible to line the inner wall of the defective or old pipe with a rigid liner without digging the ground and disassembling the pipe sections.

Specifically, in the foregoing pipe lining method, one end of a pipe liner bag 201 is folded out, for example, as illustrated in FIG. 30, and a folded portion of the pipe liner bag 201 is fixed over the outer periphery of an upper end of a top collar 202 installed on the ground. Then, water is poured into the folded portion of the pipe liner bag 201 from a water supply hose 203 to evert the pipe liner bag 201 with the water pressure. Consequently, the pipe liner bag 201 is inserted into a pipe line 250 through a manhole 251.

However, the conventional pipe lining method illustrated in FIG. 30 involves passage of the pipe liner bag 201, which has a diameter substantially equal to the inner diameter of the pipe line 250, through the manhole 251, the opening of the manhole 251 is almost closed by the pipe liner bag 201 particularly when the pipe line 251 has a large diameter, so that an operator cannot enter the manhole 251 for inspection or the like during the lining operation. Also, the pipe liner bag 201 inevitably includes a portion which does not serve for lining the pipe line 250 (a portion of the pipe liner bag 201 which extends from the pipe line 250 to the ground through the manhole 251), and this portion is wasted, thus causing a problem from an economical point of view.

To solve this problem, a method of installing a cylindrical pipe liner bag everting nozzle 204 on the bottom of the manhole 251, as illustrated in FIG. 31, has been proposed in view of economies. Specifically, the illustrated method involves inserting a guide tube 206, having one end attached to a top collar 205 installed on the ground, into the manhole 251; fixing the other end of the guide tube 206 to a guide tube fixing end which is open to one end of the pipe liner bag everting nozzle 204; passing a pipe liner bag 201 into the guide tube 206 and the pipe liner bag everting nozzle 204 from the ground; folding out a leading end portion of the pipe liner bag 201 and fixing the folded portion to a pipe liner bag fixing end which is open to the other end of the pipe liner bag everting nozzle 304; pouring water into the folded portion of the pipe liner bag 201 from a water supply hose 203 to evert the pipe liner bag 201 into a pipe line 250 with the water pressure.

However, even in the foregoing improved method, the guide tube fixing end of the pipe liner bag everting nozzle 204 has the same diameter as the pipe liner bag fixing end, so that the guide tube 206 having a larger diameter is required as the pipe line 250 is larger. Therefore, as illustrated in FIG. 31, the opening of the manhole 251 is almost closed by the guide tube 206, thereby preventing the operator from entering the manhole 251 for inspection or the like during the lining operation.

In addition, when the pipe liner bag 201 is everted using an elbow-shaped pipe liner bag everting nozzle 207 which is bent at 90 degrees as illustrated in FIG. 32, the pipe liner bag everting nozzle 207 has a larger height dimension H. For passing the pipe liner bag everting nozzle 207 through the opening of the manhole 251, the height dimension H must be smaller than the opening diameter D of the manhole 251 (H<D). Also, a diameter d of the pipe liner bag fixing end of the pipe liner bag everting nozzle 207 is limited by the height dimension H, applications of this type of pipe liner bag everting nozzle 207 are limited to pipe lines having small diameters.

OBJECT AND SUMMARY OF THE INVENTION

The present invention has been made in view of the problems mentioned above, and it is an object of the present invention to provide a pipe liner bag everting nozzle which allows the operator to access a manhole during a lining operation, and a pipe lining method using this pipe liner bag everting nozzle.

To achieve the above object, according to a first aspect of the present invention, a pipe liner bag everting nozzle includes a guide tube fixing end for fixing one end of a guide tube, and a pipe liner bag fixing end for fixing a folded end of an uneverted pipe liner bag passed through the guide tube, wherein the guide tube fixing end has a diameter smaller than a diameter of the pipe liner bag fixing end.

Also, in the first aspect, a method of lining a pipe uses a pipe liner bag everting nozzle which includes a guide tube fixing end for fixing one end of a guide tube, and a pipe liner bag fixing end for fixing a folded end of an uneverted pipe liner bag passed through the guide tube, wherein the guide tube fixing end has a diameter smaller than a diameter of the pipe liner bag fixing end. The method includes the steps of installing the pipe liner bag everting nozzle such that the pipe liner bag fixing end opposes an opening of a pipe line to be lined, drawing a guide tube fixed to the guide tube fixing end of the pipe liner bag everting nozzle substantially vertically to the ground, everting a pipe liner bag fixed to the pipe liner bag fixing end with a fluid pressure into the pipe line, and hardening a hardenable resin impregnated in the pipe liner bag with the pipe liner bag being pressed onto an inner wall of the pipe line.

In a second aspect of the present invention, a pipe liner bag everting nozzle includes a guide tube fixing nozzle for fixing one end of a guide tube, a pipe liner bag fixing nozzle for fixing a folded end of an uneverted pipe liner bag passed through the guide tube, and a closer plate for coupling the guide tube fixing nozzle to the pipe liner bag fixing nozzle in an air tight structure, wherein the guide tube fixing nozzle has a diameter smaller than a diameter of the pipe liner bag fixing nozzle.

Also, in the second aspect, a method of lining a pipe uses a pipe liner bag everting nozzle which includes a guide tube fixing nozzle for fixing one end of a guide tube, a pipe liner bag fixing nozzle for fixing a folded end of an uneverted pipe liner bag passed through the guide tube, and a closer plate for coupling the guide tube fixing nozzle to the pipe liner bag fixing nozzle in an air tight structure, wherein the guide tube fixing nozzle has a diameter smaller than a diameter of the pipe liner bag fixing nozzle. The method includes the steps of installing the pipe liner bag everting nozzle such that the pipe liner bag fixing nozzle opposes an opening of a pipe line to be lined, drawing a guide tube fixed to the guide tube fixing nozzle of the pipe liner bag everting nozzle substantially vertically to the ground, everting a pipe liner bag fixed to the pipe liner bag fixing nozzle with a fluid pressure into the pipe line, and hardening a hardenable resin impregnated in the pipe liner bag with the pipe liner bag being pressed onto an inner wall of the pipe line.

As described above, the guide tube fixing end of the pipe liner bag everting nozzle has a diameter smaller than the diameter of the guide tube fixing end in the first aspect, and the guide tube fixing nozzle of the pipe liner bag everting nozzle has a diameter smaller than the diameter of the guide tube fixing nozzle in the second aspect, so that a guide tube having a smaller diameter than that of a pipe line to be repaired (or the pipe liner bag) can be used. Since a sufficient gap is formed between the guide tube and the manhole, the operator can freely access the manhole during the lining operation for inspection and confirmation of a lining situation and so on.

Also, according to first and second aspect of the present invention, the pipe liner bag is everted using the guide tube, so that the pipe liner bag need not be drawn out to the ground through the manhole, thereby eliminating a portion-of the pipe liner bag, which is not used for lining and wasted, to improve the economies of the pipe lining method.

The above and other objects, features, and advantages of the present invention will become apparent from the following detailed description of the preferred embodiments thereof when read in conjunction with the accompanying drawings.

DESCRIPTION OF THE PREFERRED EMBODIMENTS

The present invention will hereinafter be described in connection with various embodiments thereof with reference to the accompanying drawings.

First, a pipe liner bag everting nozzle (hereinafter simply called the "everting nozzle") according to one aspect of the present invention will be described in various embodiments.

Figure 1:
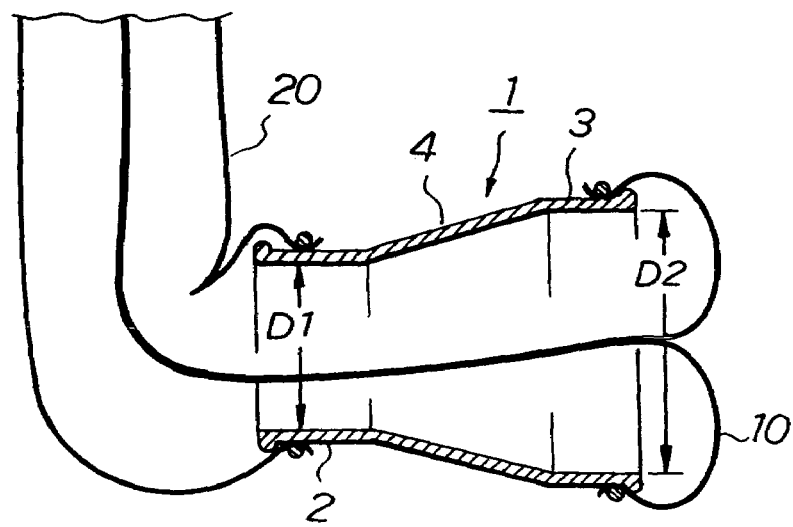
FIG. 1 is a cross-sectional view illustrating a pipe liner bag everting nozzle according to a first embodiment of the present invention.

FIG. 1 is a cross-sectional view of an everting nozzle 1 according to a first embodiment. The everting nozzle 1 is implemented as a straight reducer pipe made of a metal such as iron, aluminum, stainless steel or the like, or made of a plastic material. The everting nozzle 1 has a smaller diameter cylinder at one end which serves as a guide tube fixing end 2, and a larger diameter cylinder at the other end which serves as a pipe liner bag fixing end 3. The guide tube fixing end 2 and the pipe liner bag fixing end 3 are coupled by a tapered reducer 4. It should be noted that the liner bag fixing end 3 of the everting nozzle 1 has a diameter D2 equal to or slightly smaller than the diameter of a pipe line associated therewith.

In the everting nozzle 1 according to the first embodiment, both the guide tube fixing end 2 and the pipe liner bag fixing end 3 are open in opposite directions on the same axis, and the guide tube fixing end 2 has a diameter D1 which is set smaller by 30% or more than the diameter D2 of the pipe liner bag fixing end 3 ($D1 \leq 0.7D2$). Then, one end of a guide tube 20 is attached to the outer periphery of the guide tube fixing end 2 of the everting nozzle 1, as illustrated. An uneverted pipe liner bag 10 is passed into the guide tube 20 and the everting nozzle 1, and one end of the pipe liner bag 10, which extends outward from the everting nozzle 1, is folded out and attached to the outer periphery of the pipe liner bag fixing end 3 of the everting nozzle 1.

Next, an everting nozzle 11 according to a second embodiment will be described for the structure with reference to FIG. 2.

Figure 2:
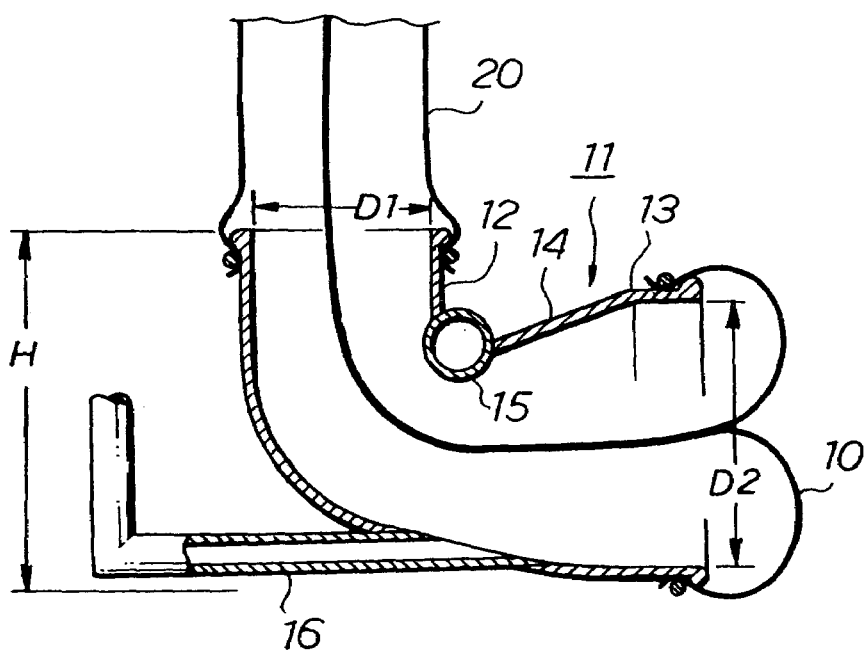
FIG. 2 is a cross-sectional view illustrating a pipe liner bag everting nozzle according to a second embodiment of the present invention.

FIG. 2 is a cross-sectional view of the everting nozzle 11 according to the second embodiment. The everting nozzle 11 is implemented as a 90° elbow reducer pipe made of a metal such as iron, aluminum, stainless steel or the like, or made of a plastic material. Like the first embodiment, the everting nozzle 11 has a smaller diameter cylinder at one end which serves as a guide tube fixing end 12, and a larger diameter cylinder at the other end which serves as a pipe liner bag fixing end 13. The guide tube fixing end 12 and the pipe lining bag fixing end 13 are coupled by a tapered reducer 14, where the guide tube fixing end 12 is open to above, while the pipe liner bag fixing end 13 is open to the right in FIG. 2. In other words, the guide tube fixing end 12 and the pipe liner bag fixing end 13 are open in directions substantially perpendicular to each other.

In addition, the everting nozzle 11 of the second embodiment is provided with a corner guide member 15 in a circular pipe shape which is attached at a connection of the guide tube fixing end 12 with the pipe liner bag fixing end 13 in the horizontal direction (the vertical direction to the plane of the drawing sheet) Moreover, a drain hose 16 extends from the bottom of the everting nozzle 11.

Like the first embodiment, in the everting nozzle 11 according to the second embodiment, the guide tube fixing end 12 has a diameter D1 which is set smaller by 30% or more than the diameter D2 of the pipe liner bag fixing end 13 ($D1 \leq 0.7D2$). Then, one end of a guide tube 20 is attached to the outer periphery of the guide tube fixing end 12 of the everting nozzle 11, as illustrated. An uneverted pipe liner bag 10 is passed into the guide tube 20 and the everting nozzle 11, and one end of the pipe liner bag 10, which extends outward from the everting nozzle 11, is folded out and attached to the outer periphery of the pipe liner bag fixing end 13 of the everting nozzle 11. The height dimension H of the everting nozzle 11 is set smaller than the inner diameter of an opening of a manhole, not shown.

Next, an everting nozzle 21 according to a third embodiment will be described for the structure with reference to FIGS. 3 and 4.

Figure 3:
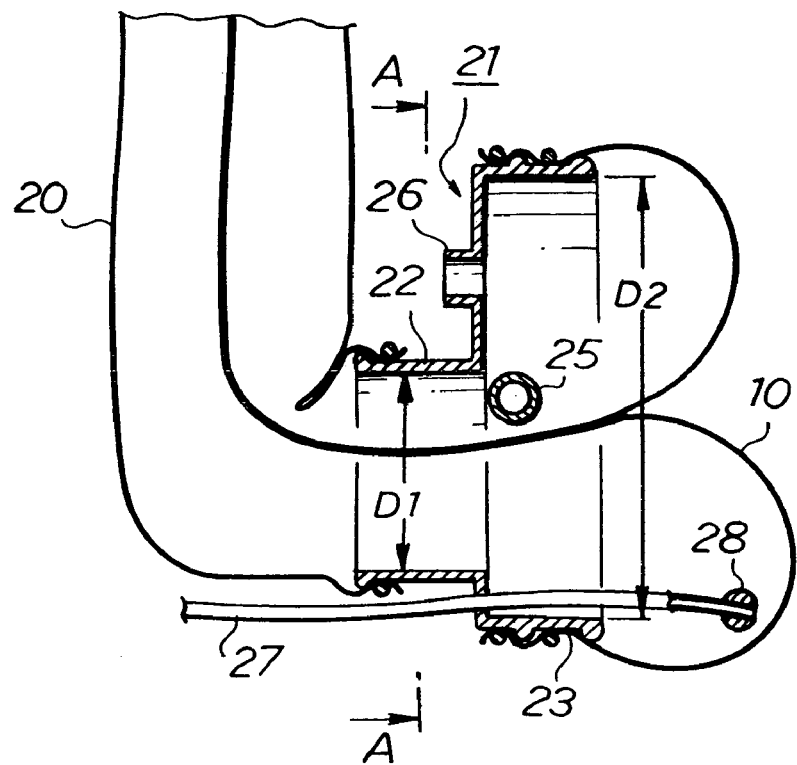
FIG. 3 is a cross-sectional view illustrating a pipe liner bag everting nozzle according to a third embodiment of the present invention.
Figure 4:
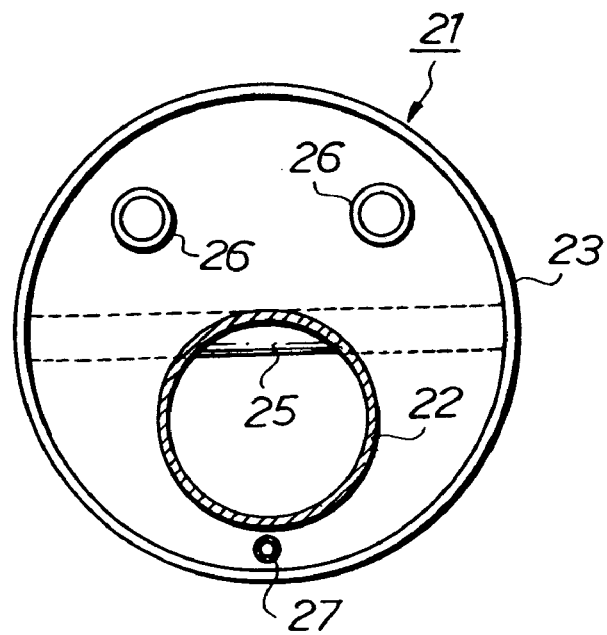
FIG. 4 is a dross-sectional view taken along a line A—A in FIG. 3.

FIG. 3 is a cross-sectional view of the everting nozzle 21 according to the third embodiment, and FIG. 4 is a cross-sectional view taken along a line A—A in FIG. 3. The everting nozzle 21 comprises a smaller diameter cylinder which is open to one direction and serves as a guide tube fixing end 22, and a larger diameter cylinder which is open to the opposite direction and serves as a pipe liner bag fixing end 23. The two ends 22, 23 are offset from each other. Like the aforementioned embodiments, the guide tube fixing end 22 has a diameter D1 which is set smaller by 30% or more than the diameter D2 of the pipe liner bag fixing end 23 ($D1 \leq 0.7D2$). Then, one end of a guide tube 20 is attached to the outer periphery of the guide tube fixing end 22 of the everting nozzle 21, as illustrated. An uneverted pipe liner bag 10 is passed into the guide tube 20 and the everting nozzle 21, and one end of the pipe liner bag 10, which extends outward from the everting nozzle 21, is folded out and attached to the outer periphery of the pipe liner bag fixing end 23 of the everting nozzle 21. The everting nozzle 21 of the third embodiment is also made of a metal such as iron, aluminum, stainless steel or the like, or made of a plastic material.

Also, the everting nozzle 21 of the third embodiment is provided with a corner guide member 25 in a circular pipe shape which is attached in an inner corner portion near a connection of the guide tube fixing end 22 with the pipe liner bag fixing end 23 in the horizontal direction (the horizontal direction in FIG. 4). In addition, a drain port and an intake port, collectively designated by reference numeral 26, are open in an upper portion of the guide tube fixing end 22, and a drain hose 27 is inserted through the everting nozzle 21 and appears below the guide tube fixing end 22. Further, a weight 28 is attached to one end of the drain hose 27 which extends outward from the pipe liner bag fixing end 23.

Next, an everting nozzle 31 according to a fourth embodiment of the present invention will be described with reference to FIGS. 5 through 7.

Figure 5:
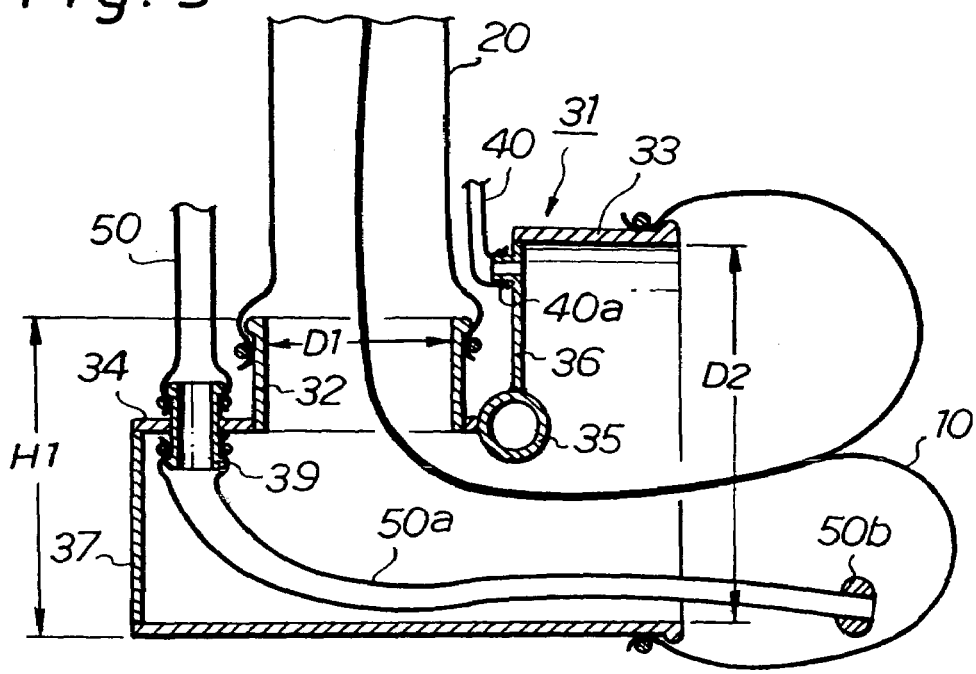
FIGS. 5 through 7 are perspective views illustrating a pipe liner bag everting nozzle according to a fourth embodiment of the present invention.
Figure 6:
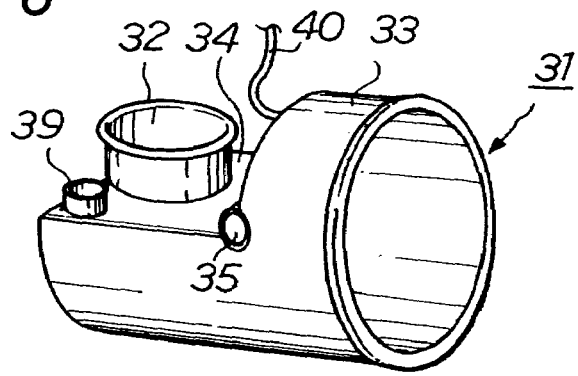
Figure 7:
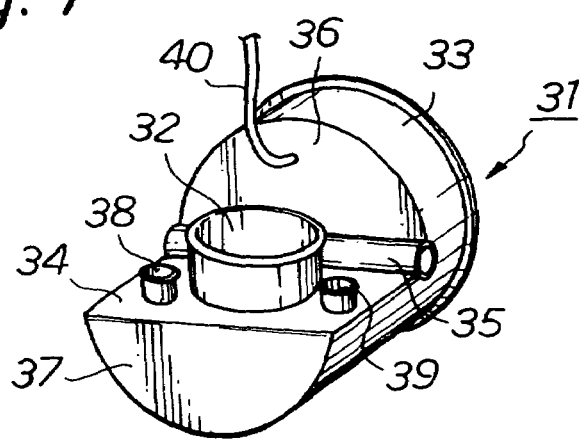

FIG. 5 is a cross-sectional view of the everting nozzle 31 according to the fourth embodiment, and FIGS. 6 and 7 are perspective views of the everting nozzle 3. The everting nozzle 31 according to the fourth embodiment comprises a pipe liner bag fixing end 33, and a circular guide tube fixing end 31, an exhaust port 38 and a drain port 39 which are implanted on a flat plate 34 that covers the top surface of a lower half of a circular pipe having the same diameter as the pipe liner bag fixing end 33, from which the upper half (a portion adjoining the pipe liner bag fixing end 33) has been removed. An open end of the lower half of the circular pipe is closed by a plate 37, while an open end of the upper half of the pipe liner bag fixing end 33, opposite to the opening, is closed by a plate 36. Then, a corner guide member 35 in a circular pipe shape is attached at a connection of the plate 34 and the plate 36 in the horizontal direction (in the vertical direction to the plane of the drawing sheet). An intake port 40a (see FIG. 5) is attached to the vertical plate 36, and an air hose 40 is attached to the intake port 40a. The guide tube fixing end 32 as well as the exhaust port 38 and the drain port 39 are open to the interior of the everting nozzle 31. As illustrated in FIG. 5, one end of a flexible heat-resistant hose 50a is attached to the outer periphery of the inner opening of the drain port 39 which is open to the interior of the everting nozzle 31. The other end of the heat-resistant hose 50a extends outward from the pipe liner bag fixing end 33, and a weight 50b is attached around the leading end of the heat-resistant hose 50a. As illustrated in FIG. 5, a drain hose 50 is connected to the drain port 39.

In the everting nozzle 31 of the fourth embodiment, the guide tube fixing end 32 is open to above, while the pipe liner bag fixing end 33 is open to the right in FIG. 5. In other words, the guide tube fixing end 32 and the pipe liner bag fixing end 33 are open in directions substantially perpendicular to each other. The guide tube fixing end 32 has a diameter D1 which is set smaller by 30% or more than the diameter D2 of the pipe liner bag fixing end 33 (D1 0.7D2). Then, one end of a guide tube 20 is attached to the outer periphery of the guide tube fixing end 32 of the everting nozzle 31, as illustrated. An uneverted pipe liner bag 10 is passed into the guide tube 20 and the everting nozzle 31, and one end of the pipe liner bag 10, which extends outward from the everting nozzle 31, is folded out and attached to the outer periphery of the pipe liner bag fixing end 33 of the everting nozzle 31.

Also, in the everting nozzle 31 of the fourth embodiment, the guide tube fixing end 32 is positioned inside a circum-circle of a circular pipe which constitutes the pipe liner bag fixing end 33. Therefore, the guide tube fixing end 32 does not protrude outward from the pipe liner bag fixing end 33 in the radial direction, and its height dimension H1 is set smaller than the diameter D2 of the pipe liner bag fixing end 33 (H1<D2). The everting nozzle 31 of the fourth embodiment is also made of a metal such as iron, aluminum, stainless steel or the like, or made of a plastic material.

Next, a pipe lining method according to an embodiment of the present invention, which is performed using the everting nozzle 31 illustrated in FIGS. 5 through 7, will be described with reference to FIGS. 8 through 11. FIGS. 8 through 11 are cross-sectional views illustrating in order the steps of the pipe lining method according to the present invention.

Figure 8:
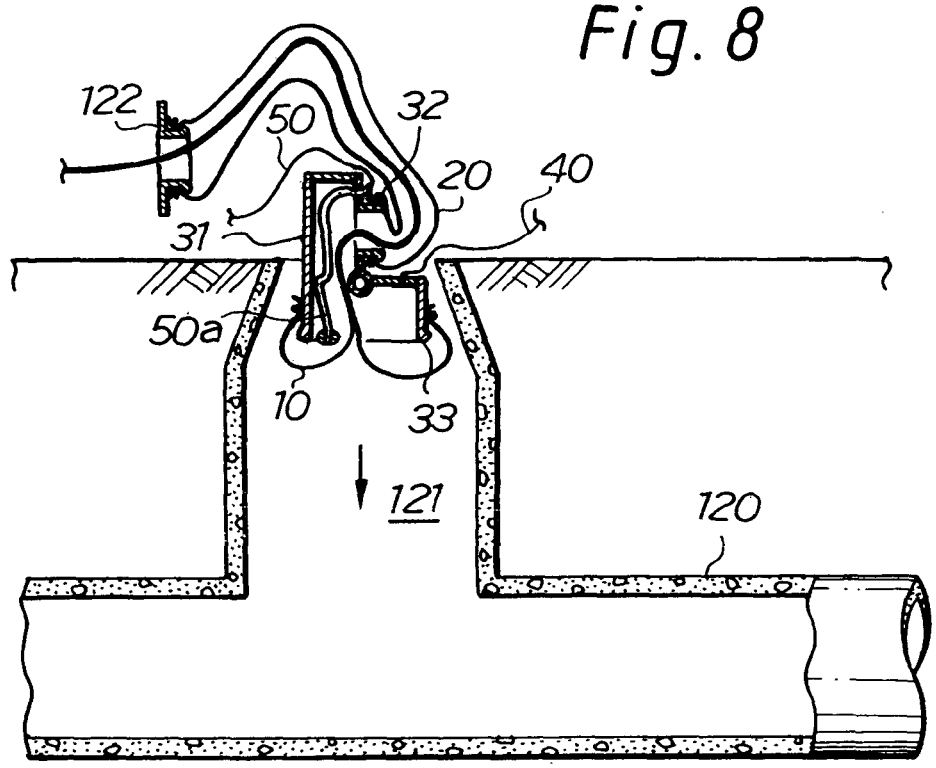
FIG. 8 is a cross-sectional view illustrating a step of setting a pipe liner bag everting nozzle in a pipe lining method which is performed using the pipe liner bag everting nozzle illustrated in FIGS. 5 through 7 in accordance with an embodiment of the present invention.

Referring first to FIG. 8, a pipe line 120 such as a sewage pipe is embedded in the ground, and is connected to a manhole 121 which is open to the ground.

For lining the pipe line 120, the everting nozzle 31 is introduced into the manhole 121 with the pipe liner bag fixing end oriented downward, as illustrated in FIG. 8. In this event, one end of the guide tube 20 is attached to the guide tube fixing end 32 of the everting nozzle 31; the folded end of the pipe liner bag 10 to the pipe liner bag fixing end 33; a drain hose 50 to the drain port 39; and an air hose 40 to the intake port 40a, respectively. Also, one end of the flexible heat-resistant hose 50a is attached to the drain port 39 which is open to the interior of the everting nozzle 31, and a top nozzle 122 is attached to the other end of the guide tube 20.

As described above, in the everting nozzle 31, the guide tube fixing end 32 does not protrude outward from the pipe liner bag fixing end 33 in the radial direction, so that the guide tube fixing end 32 will not be any impediment when the everting nozzle 31 is introduced into the manhole 121. Therefore, the everting nozzle 31 is readily passed through the opening of the manhole 121 having a larger diameter than that of the pipe liner bag fixing end 33 for introduction into a pipe line through the manhole 121.

Here, the pipe liner bag 10 is comprised of a tubular unwoven fabric such as polyester, vinylon, acrylic or the like impregnated with an unhardened hardenable liquid resin, and a highly air thigh plastic film coated over the tubular unwoven fabric. For the unhardened hardenable liquid resin impregnated in the tubular unwoven fabric may be any of thermosetting resins such as unsaturated polyester resin, vinylester resin, epoxy resin, and so on.

The guide tube 20 in turn is made of a plastic tube reinforced by a woven or an unwoven fabric which is a flexible one that is flat when it is not applied with a pressure.

Figure 9:
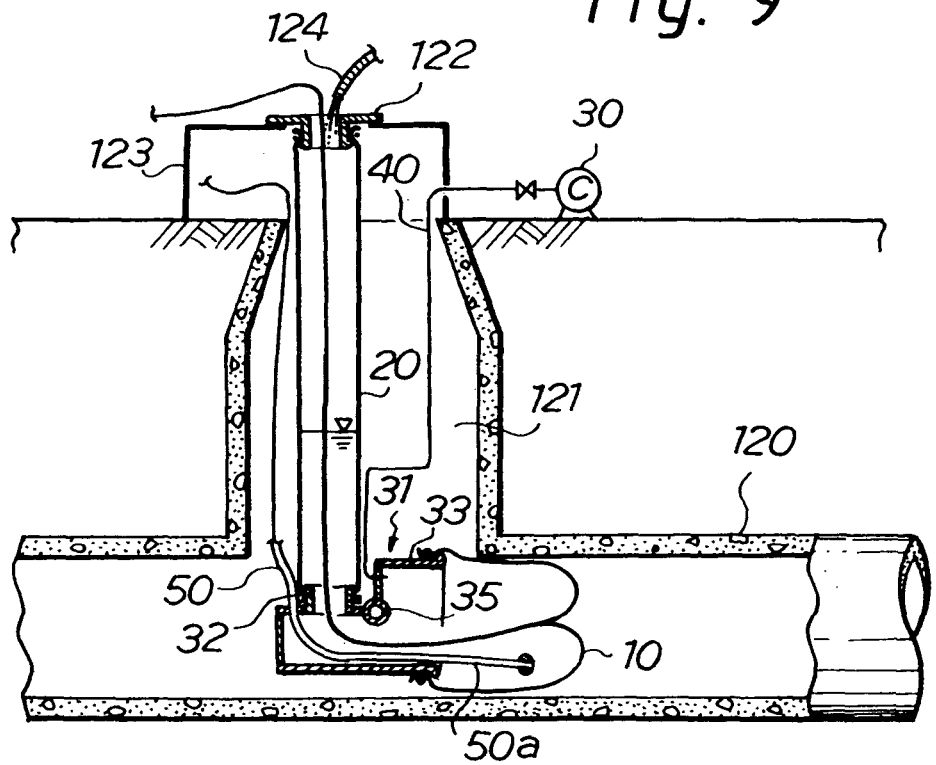
FIG. 9 is a cross-sectional view illustrating a step of everting the pipe liner bag in the pipe lining method which is performed using the pipe liner bag everting nozzle illustrated in FIGS. 5 through 7 in accordance with the embodiment of the present invention.

Then, as illustrated in FIG. 9, the everting nozzle 31 is set at a position on the bottom of the manhole 121, which is 10 to 60 cm away from the opening of the pipe line 120, substantially parallel to the pipe way 120. In the thus set state, the pipe liner bag fixing end 33 opposes the pipe line 120, the guide tube fixing end 32 is oriented upward, the guide tube 20 having one end (lower end) fixed to the guide tube fixing end 32 extends in the manhole 121 vertically toward the ground, and the top nozzle 122 attached to the upper end of the guide tube 20 is set on and supported by a base 123 installed on the ground.

Also, the drain hose 50 and the air hose 40 connected to the everting nozzle 31 also extend through the manhole 121 to the ground, and the air hose 40 is connected to a compressor 30 installed on the ground.

Subsequently, as water is poured into the guide tube 20 through a water supply hose 124 from the opening of the guide tube 20 attached to the top nozzle 122 as illustrated in FIG. 9, the pipe liner bag 10 is inserted into the pipe line 120 as it is everted with the water pressure. Then, after the pipe liner bag 10 has been inserted into the pipe line 120 over a predetermined length, a pressurized space S' sealed by the water is formed within the pipe liner bag 10 and the everting nozzle 31, as illustrated in FIG. 10.

Figure 10:
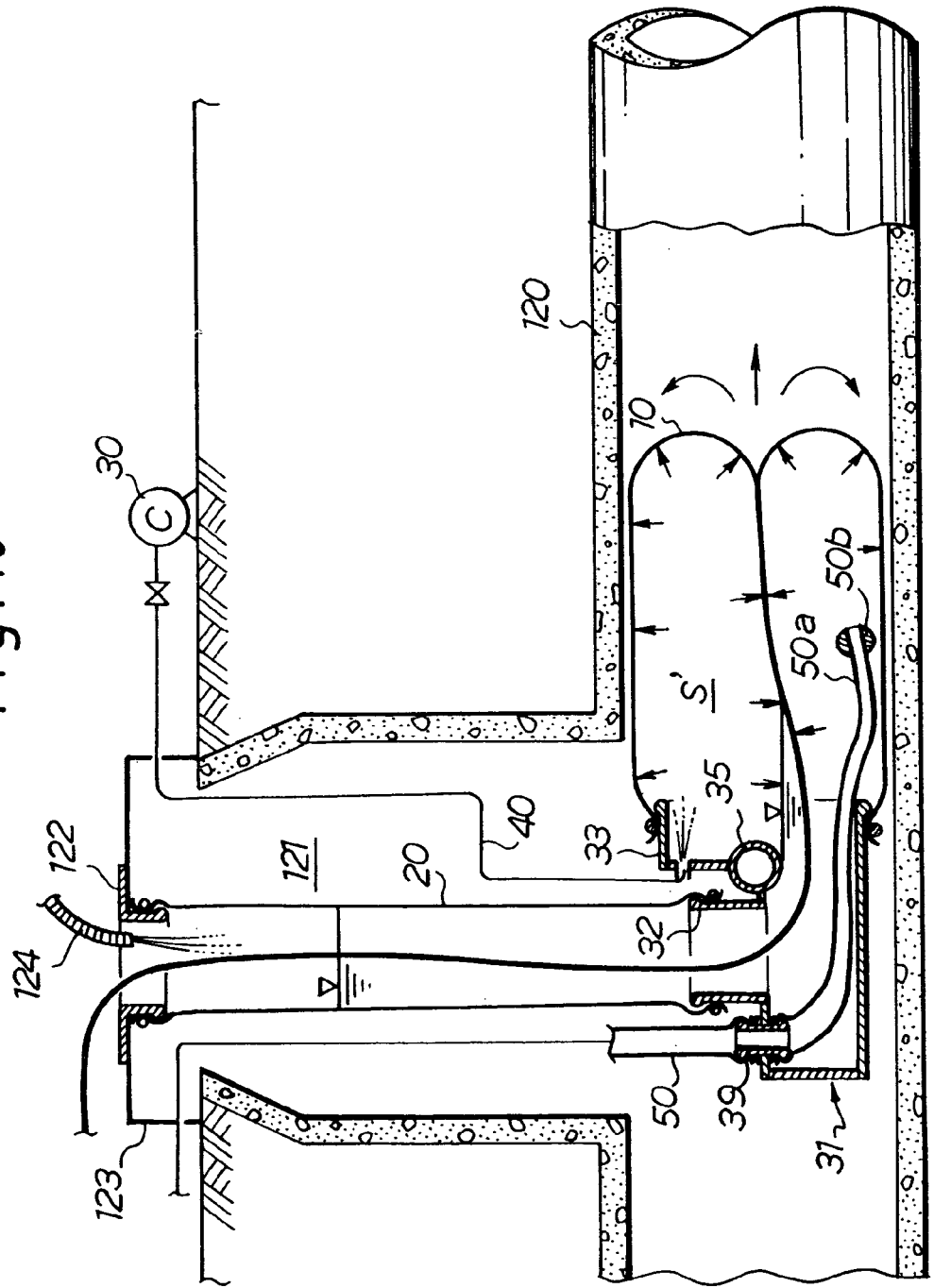
FIG. 10 is a cross-sectional view illustrating a step of everting the pipe liner bag in the pipe lining method which is performed using the pipe liner bag everting nozzle illustrated in FIGS. 5 through 7 in accordance with the embodiment of the present invention.

Then, in the state illustrated in FIG. 10, as the compressor 30 is driven to supply compressed air into the pressurized space S' through the air hose 40, the pipe liner bag 10 is sequentially inserted into the pipe line 120 as it is everted with the pressure of the compressed air. In this event, since the corner guide member 35 is provided in the corner portion of the everting nozzle 31, an uneverted portion of the pipe liner bag 10 is smoothly fed and everted as guided by the corner guide member 35. As the pipe liner bag 10 has is inserted into the pipe line 120, the tubular unwoven fabric impregnated with a thermosetting resin of the pipe liner bag 10 is pressed onto the inner wall surface of the pipe line 120, so that the inner surface of the unwoven fabric is covered with the plastic film.

Figure 11:
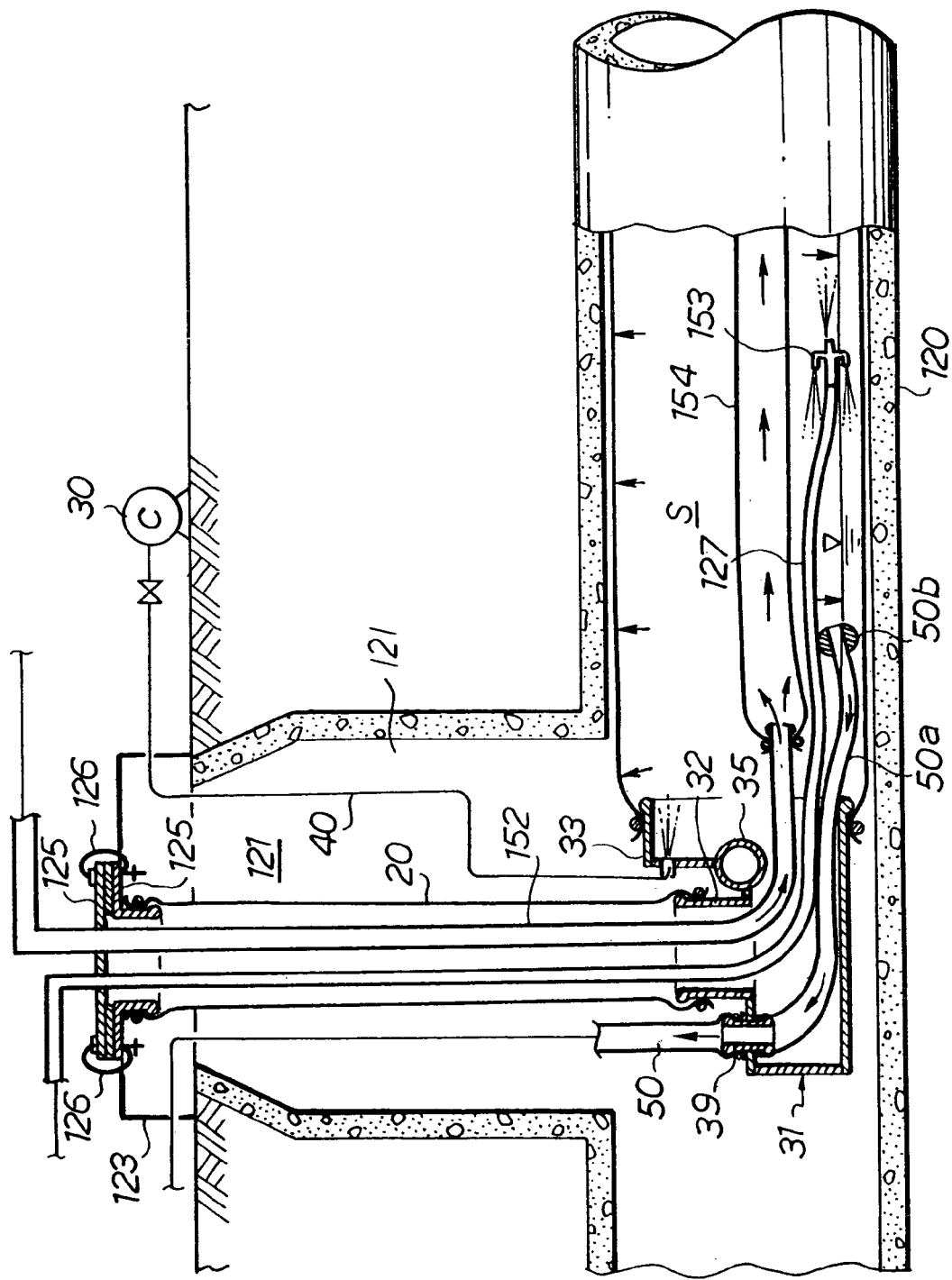
FIG. 11 is a cross-sectional view illustrating a step of hardening the pipe liner bag in the pipe lining method which is performed using the pipe liner bag everting nozzle illustrated in FIGS. 5 through 7 in accordance with the embodiment of the present invention.

Consequently, when the pipe liner bag 10 has been inserted into the pipe line 120 over its entire length as illustrated in FIG. 11, a hot water hose 127 and a heat medium transport hose 152 are drawn into the pipe liner bag 10. An pour nozzle is attached to a leading end of the hot water hose 127, while a heat medium discharge hose 154 is attached to a leading end of the heat medium transport hose 152. In addition, the heat medium discharge hose 154 is formed with a plurality of discharge ports, not shown.

When the pipe liner bag 10 has been inserted into the pipe line 120 over its entire length, a top sealing lid 125 is mounted at the top of the top nozzle 122 in an air tight structure by a plurality of G clamps 126, so that a sealed space S is formed internally by the top sealing lid 125, pipe liner bag 10, everting nozzle 31 and the guide tube 20. The hot water hose 127 and the heat medium transport hose 152 extend through the top sealing lid 125 while maintaining the air tight sealing. Then, the hot water hose 127 is connected to water heating facilities including a hot water tank, a hot water pump, a boiler and so on, not shown, which are installed on the ground, and constitutes a hot water circulation system together with the drain hose 50. The heat medium transport hose 152 in turn is connected to heating facilities including a steam generator and so on, not shown, which is installed on the ground, and constitutes a heat medium circulation system together with an air drain hose, not shown, which is connected to the exhaust port 38 (see FIG. 7) of the everting nozzle 31.

In the state illustrated in FIG. 11, a constant inner pressure in the sealed space S is maintained with compressed air supplied from the compressor 30 into the sealed space S by way of the air hose 40 to inflate the pipe liner bag 10 so that the pipe liner bag 10 is pressed onto the inner wall of the pipe line 120. In this sate, the pipe liner bag 10 is heated by hot water supplied from the hot water hose 127 and poured from the pour nozzle 153 as well as by heated air and steam supplied from the heat medium transport hose 152 and discharged from the heat medium discharge hose 154. As a result, the thermosetting resin impregnated in the pipe liner bag 10 is heated and hardened, so that the inner wall of the pipe line 120 is lined by the hardened pipe liner bag 10. In this way, the pipe line 120 is repaired.

The hot water used for heating the pipe liner bag 10 is driven toward the heat-resistant hose 50a, open to the bottom of the pipe liner bag 10, with the inner pressure of the sealed space S, returned to the water heating facilities on the ground through the drain hose 50, and again heated to a predetermined temperature for serving to heat the pipe liner bag 10. The heated air and steams also used to heat the pipe liner bag 10 are returned to the heating facilities on the ground through an air drain hose, not shown, and again heated to a predetermined temperature for serving to heat the pipe liner bag 10.

In the foregoing process, the everting nozzle 31 for use in the pipe lining method according to the present invention is designed such that the guide tube fixing end 32 has the diameter D1 smaller than the diameter D2 of the pipe liner bag fixing end 33 (D1<D2), as illustrated in FIG. 5, so that the guide tube 20 having a smaller diameter than that of the pipe line 120 (or the pipe liner bag 10) can be used. As a result, a sufficient gap is formed between the guide tube 20 and the manhole 121 as illustrated in FIGS. 9 through 11, thus allowing the operator to freely access the manhole 121 during the lining operation for inspection and confirmation of a lining situation and so on.

Also, according to the pipe lining method of the present invention, the pipe liner bag 10 is everted using the guide tube 20, so that the pipe liner bag 10 need not be drawn out to the ground through the manhole 121, thereby eliminating a portion of the pipe liner bag, which is not used for lining and wasted, to improve the economies of the pipe lining method.

Figure 12:
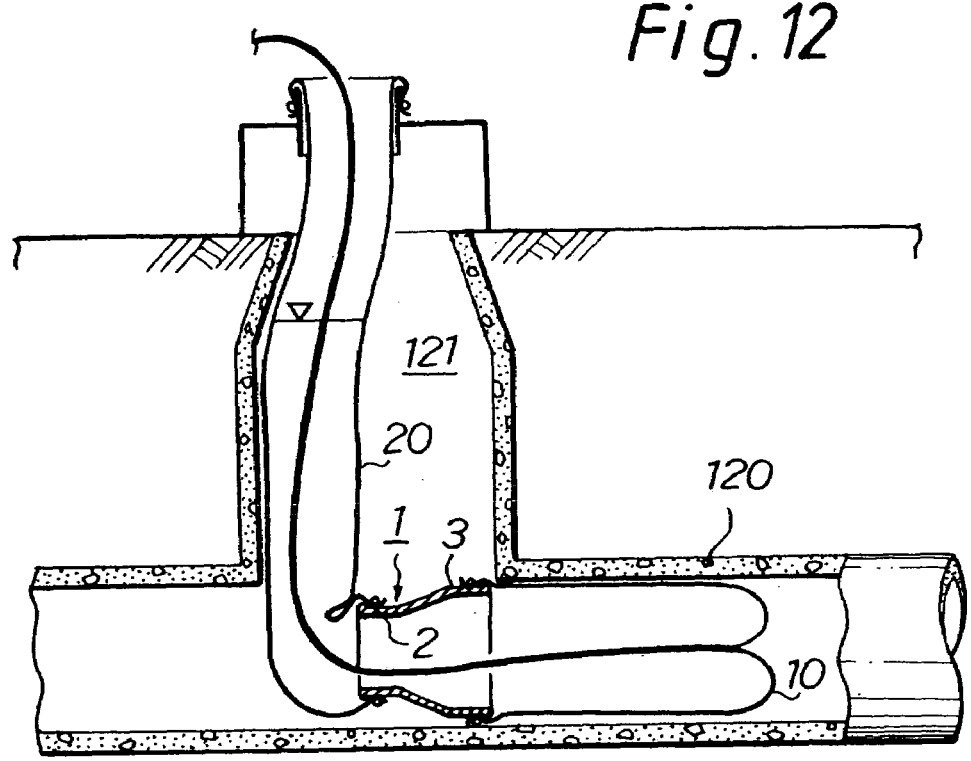
FIG. 12 is a cross-sectional view illustrating a step of everting a pipe liner bag in a pipe lining method which is performed using the pipe liner bag everting nozzle illustrated in FIG. 1 in accordance with an embodiment of the present invention.
Figure 13:
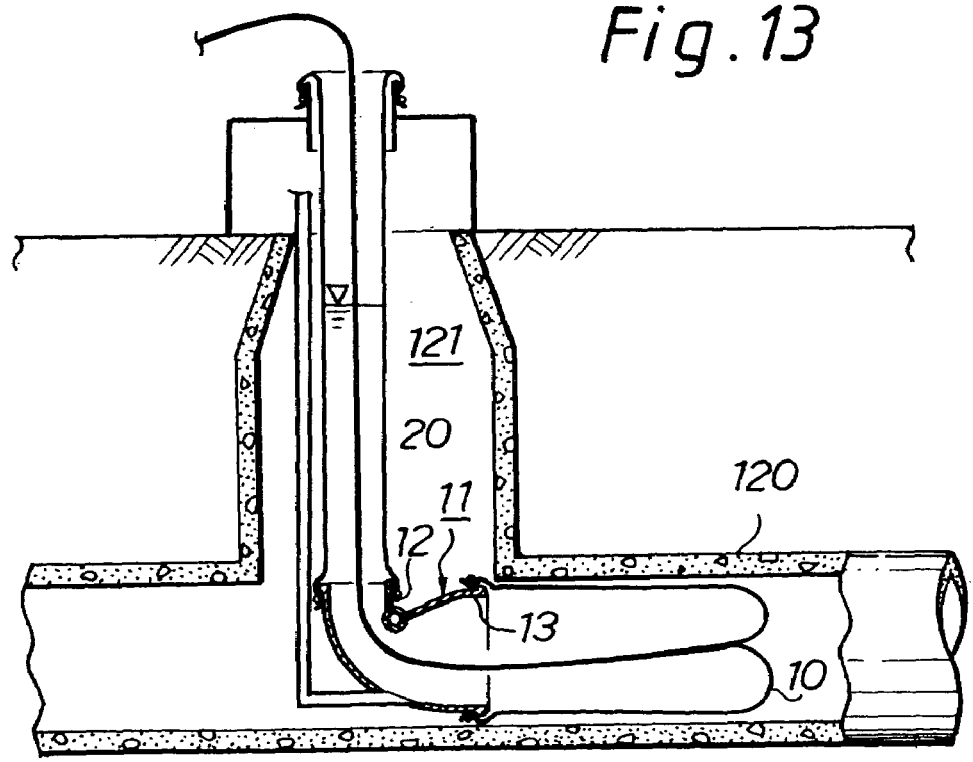
FIG. 13 is a cross-sectional view illustrating a step of everting a pipe liner bag in a pipe lining method which is performed using the pipe liner bag everting nozzle illustrated in FIG. 2 in accordance with an embodiment of the present invention.
Figure 14:
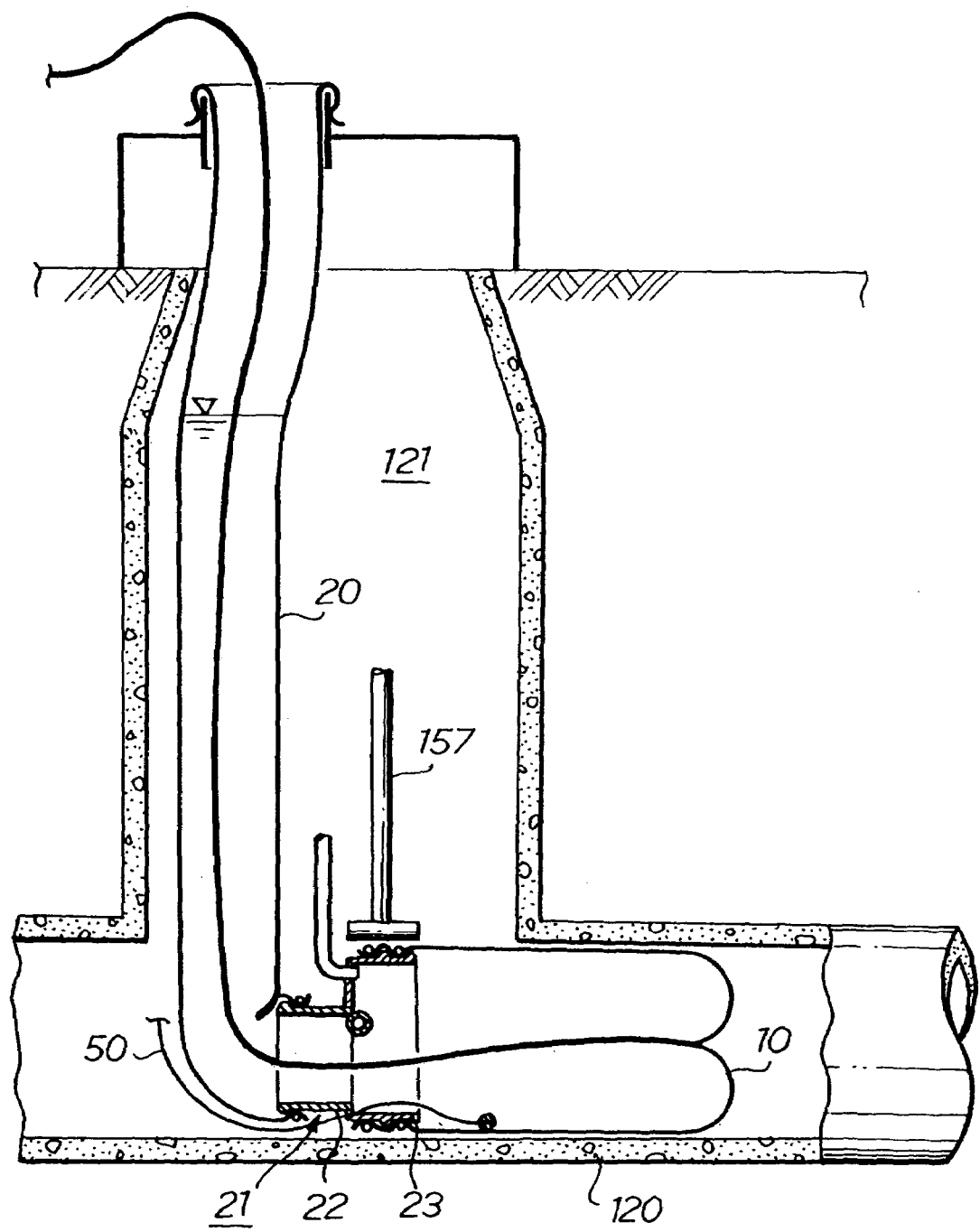
FIG. 14 is a cross-sectional view illustrating a step of everting a pipe liner bag in a pipe lining method which is performed using the pipe liner bag everting nozzle illustrated in FIGS. 3 and 4 in accordance with an embodiment of the present invention.

Now, FIGS. 12, 13, 14 illustrate how the pipe liner bag 10 is inserted into the pipe line 120 in the pipe lining method which is performed using the everting nozzle 1 illustrated in FIG. 1, the everting nozzle 11 illustrated in FIG. 2, and the everting nozzle 21 illustrated in FIGS. 3 and 4, respectively. In any of these implementations, each of the respective everting nozzles 1, 11, 21 is designed such that the guide tube fixing end 2, 12, 22 has the diameter D1 smaller than the diameter D2 of the pipe liner bag fixing end 3, 13, 23 (D1<D2), so that the guide tube 20 having a smaller diameter than that of the pipe line 120 (or the pipe liner bag 10) can be used. As a result, a sufficient gap is formed between the guide tube 20 and the manhole 121 as illustrated in FIGS. 9 through 11, thus allowing the operator to freely access the manhole 121 during the lining operation for inspection and confirmation of a lining situation and so on.

In addition, as illustrated in FIG. 14, the everting nozzle 21 may be fixed on the bottom of the manhole 121 using a pressing bar 157, such that water staying on the bottom of the pipe liner bag 10 may be drained from the drain hose 50.

Next, a pipe liner bag everting nozzle or everting nozzle according to a second aspect of the present invention will be described in various embodiment.

Figure 15:
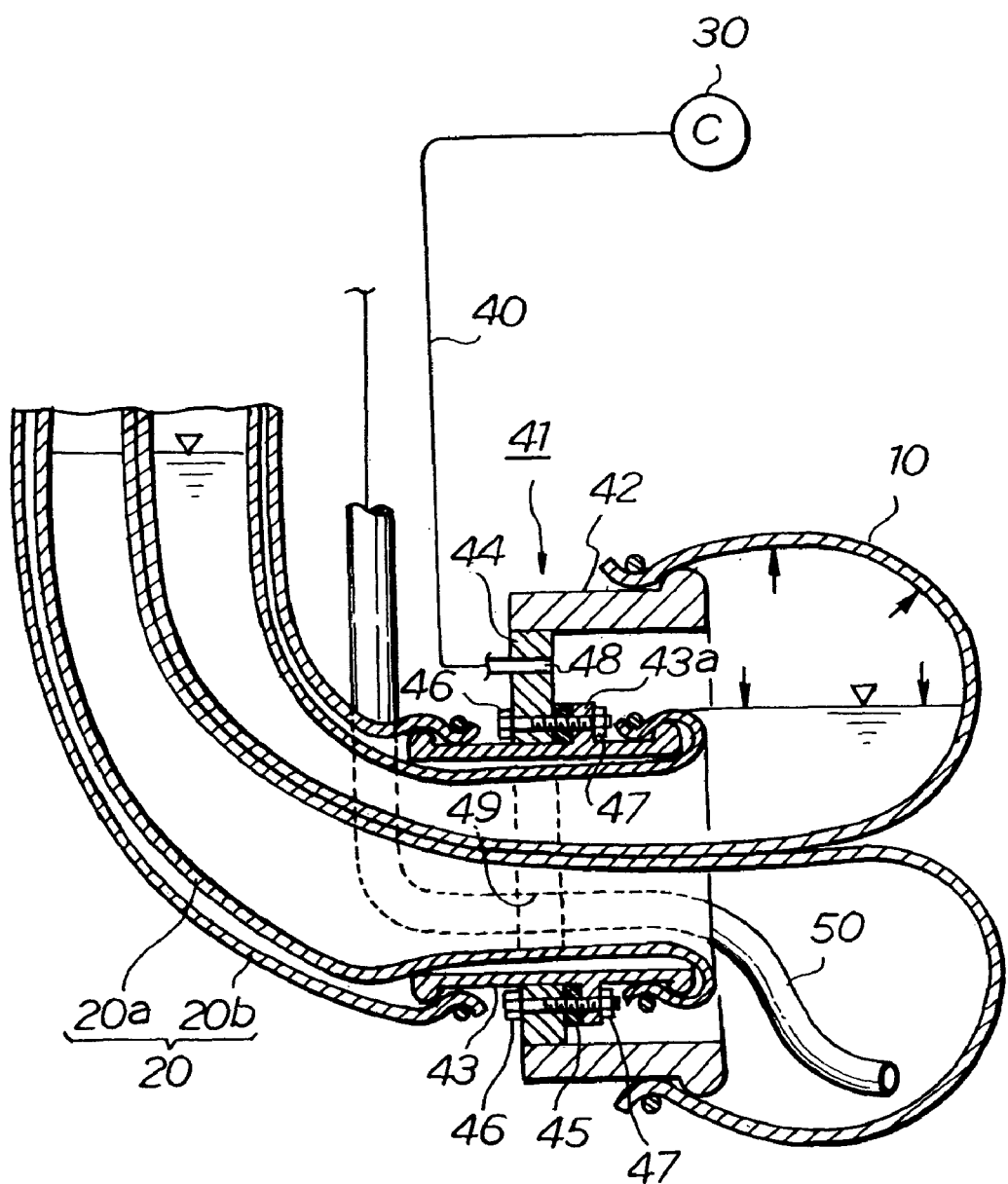
FIGS. 15 through 23 are cross-sectional views illustrating various embodiments of another pipe liner bag everting nozzle according to the present invention.

FIG. 15 is a cross-sectional view of an everting nozzle 41 according to a fifth embodiment. The illustrated everting nozzle 41 is comprised of a cylindrical pipe liner bag fixing nozzle 42 and a similarly cylindrical guide tube fixing nozzle 43, both of which are integrally coupled by a discoidal closer plate 44 in an air tight structure.

The pipe liner bag fixing nozzle 42, guide tube fixing nozzle 43 and closer plate 44 may be made of a metal such as iron, aluminum, stainless steel or the like, or made of a plastic material. The diameter of the pipe liner bag fixing nozzle 42 is set to be equal or slightly smaller than the diameter of a pipe line which is subjected to lining. The diameter of the guide tube fixing nozzle 43 is set to be smaller than the diameter of the pipe liner bag fixing nozzle 42.

The closer plate 44 is welded on the inner periphery of a rear end (left side end in FIG. 15) of the pipe liner bag fixing nozzle 42, and the guide tube fixing nozzle 43 is inserted through and removably fixed to the closer plate 44. More specifically, the guide tube fixing nozzle 43 is inserted through the closer plate 44 at a position slightly offset downward from the center of the closer plate 44. A flange 43a formed around the outer periphery of the guide tube fixing nozzle 43 is in contact with the closer plate 44 through a packing 45. The guide tube fixing nozzle 43 is removably mounted to the closer plate 44 with a plurality of bolts 46 inserted through the closer plate 44, packing 45 and flange 43a and nuts 47 in screw engagement with the bolts 46.

In the everting nozzle 41 of the fifth embodiment, the guide tube 20 is attached on the outer periphery of the guide tube fixing nozzle 43, wherein the guide tube 20 is comprised of an inner guide tube 20a and an outer guide tube 20b which constitute a double-layered structure. The outer guide tube 20b is attached on the outer periphery of one end of the guide tube fixing nozzle 43, while the inner guide tube 20a is passed inside the guide tube fixing nozzle 43, and has its end folded out and attached to the outer periphery of the other end of the guide tube fixing nozzle 43.

The inner guide tube 20a and the outer guide tube 20b are each made of a tubular woven or unwoven fabric which has a surface or an inner surface coated with a plastic film in an air tight manner. Fibers of nylon or polyester are used when the guide tube 20a and the outer guide tube 20b are made of tubular woven fabrics, while polyester is mainly used as a material for unwoven fabric, of which the guide tube 20a and the outer guide tube 20b are made. For the plastic film, a single film made of polyurethane or polyethylene, or a composite film including polyethylene, nylon, EVOH and so on may be used.

An uneverted portion of the pipe liner bag 10 is passed inside the guide tube 20 and the everting nozzle 41, and one end of the pipe liner bag 10, which extends outward from the everting nozzle 41 is folded out and attached to the outer periphery of an open end of the pipe liner bag fixing nozzle 42. Though not shown, another tubular member separate from the pipe liner bag may be attached to one end of the pipe liner bag. If the tubular member is made of a material more flexible and easy to bend than the pipe liner bag, even with a relatively hard pipe liner bag, possibly having a large thickness or including reinforcing fibers, the tubular member attached to one end of the pipe liner bag can be readily bent outward, and the bent portion can be readily attached to the outer periphery of the pipe liner bag fixing nozzle without fail.

Further, as illustrated in FIG. 15, the closer plate 44 of the everting nozzle 41 is formed with a compressed air supply port 48 in an upper portion of the closer plate 44, and with a drain port 49 in a lower portion of the same. An air hose 40 from a compressor 30 installed on the ground is connected to the compressed air supply port 48, while a drain hose 50 is inserted through the drain port 49.

Next, an everting nozzle 51 according to a sixth embodiment of the present invention will be described for the structure with reference to FIG. 16.

Figure 16:
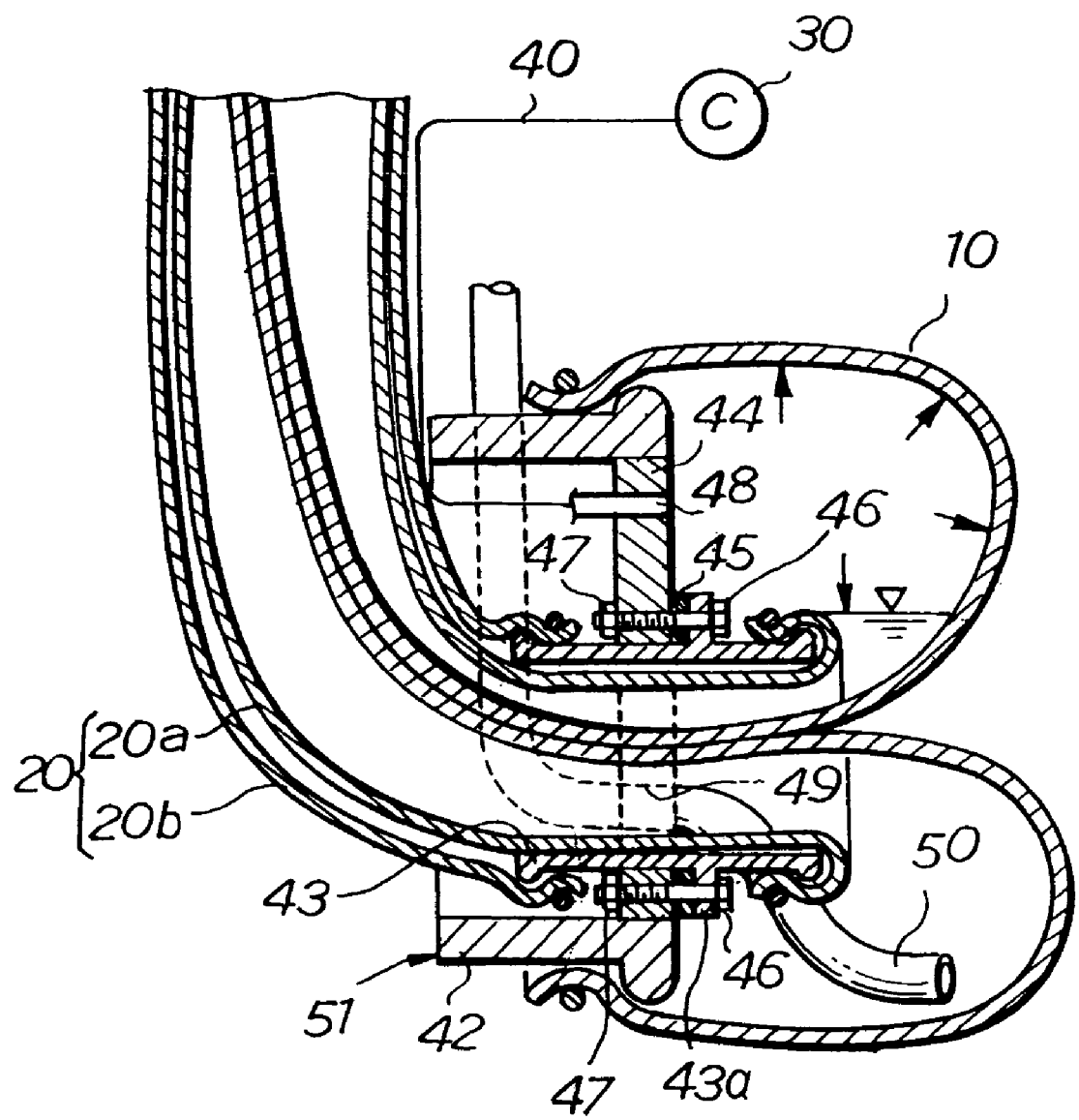

FIG. 16 is a cross-sectional view of the everting nozzle 51 according to the sixth embodiment which differs from the fifth embodiment in that the closer plate 44 is welded on the inner periphery of a front end (right side end in FIG. 16) of the pipe liner bag fixing nozzle 42, reverse to the fifth embodiment. The rest of the structure is identical to that of the everting nozzle 41 illustrated in FIG. 15. Therefore, components in FIG. 16 identical to those in FIG. 15 are designated the same reference numerals.

Next, an everting nozzle 61 according to a seventh embodiment of the present invention will be described for the structure with reference to FIG. 17.

Figure 17:
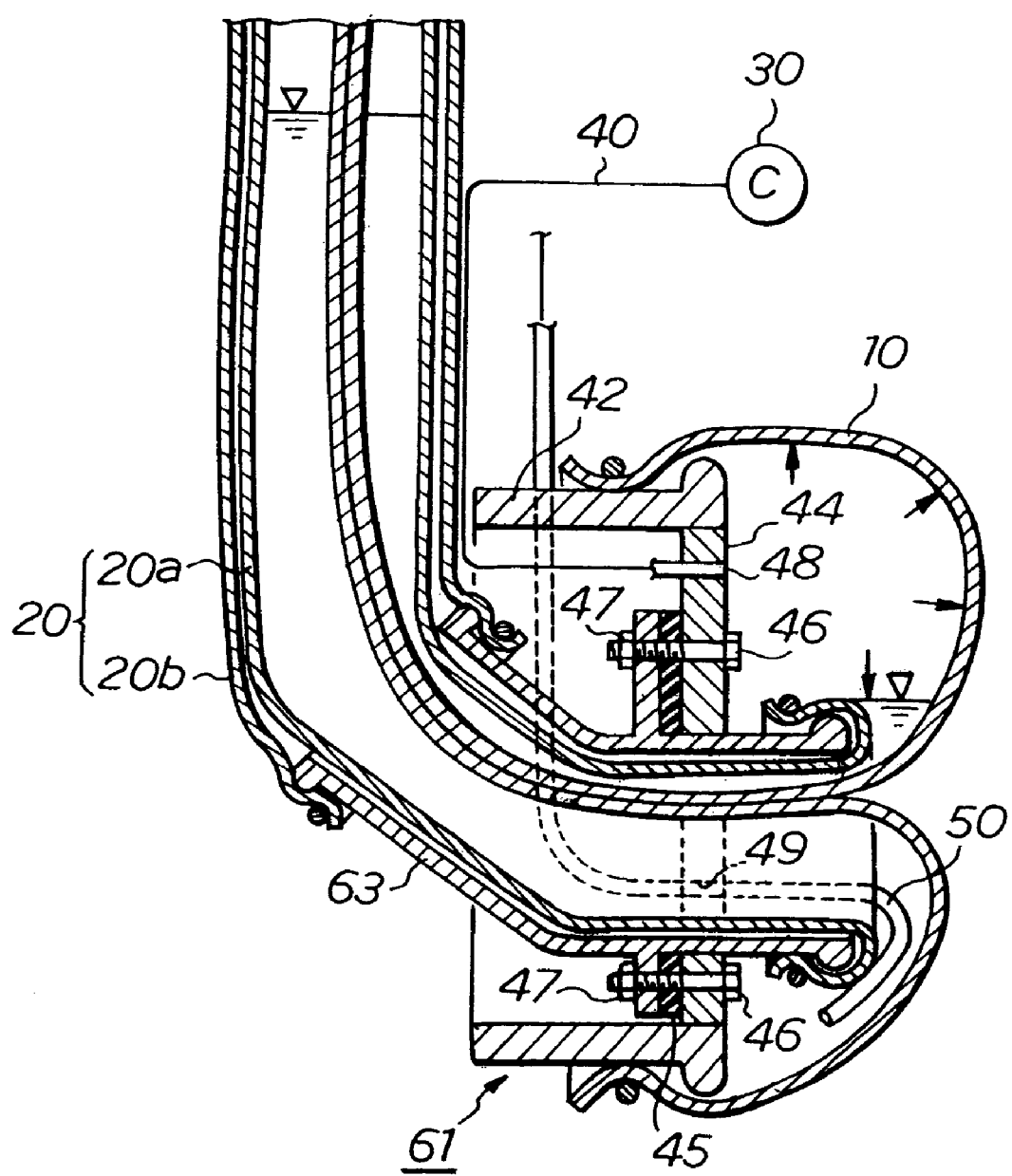

FIG. 17 is a cross-sectional view of the everting nozzle 61 according to the seventh embodiment which differs from the everting nozzle 51 illustrated in FIG. 16 in that the guide tube fixing nozzle 43 of the latter is replaced with a guide tube fixing nozzle 63 which has a curve in a portion thereof. The rest of the structure is identical to that of the everting nozzle 51 illustrated in FIG. 16. Therefore, components in FIG. 17 identical to those in FIG. 16 are designated the same reference numerals.

Next, an everting nozzle 71 according to an eighth embodiment of the present invention will be described for the structure with reference to FIG. 18.

Figure 18:
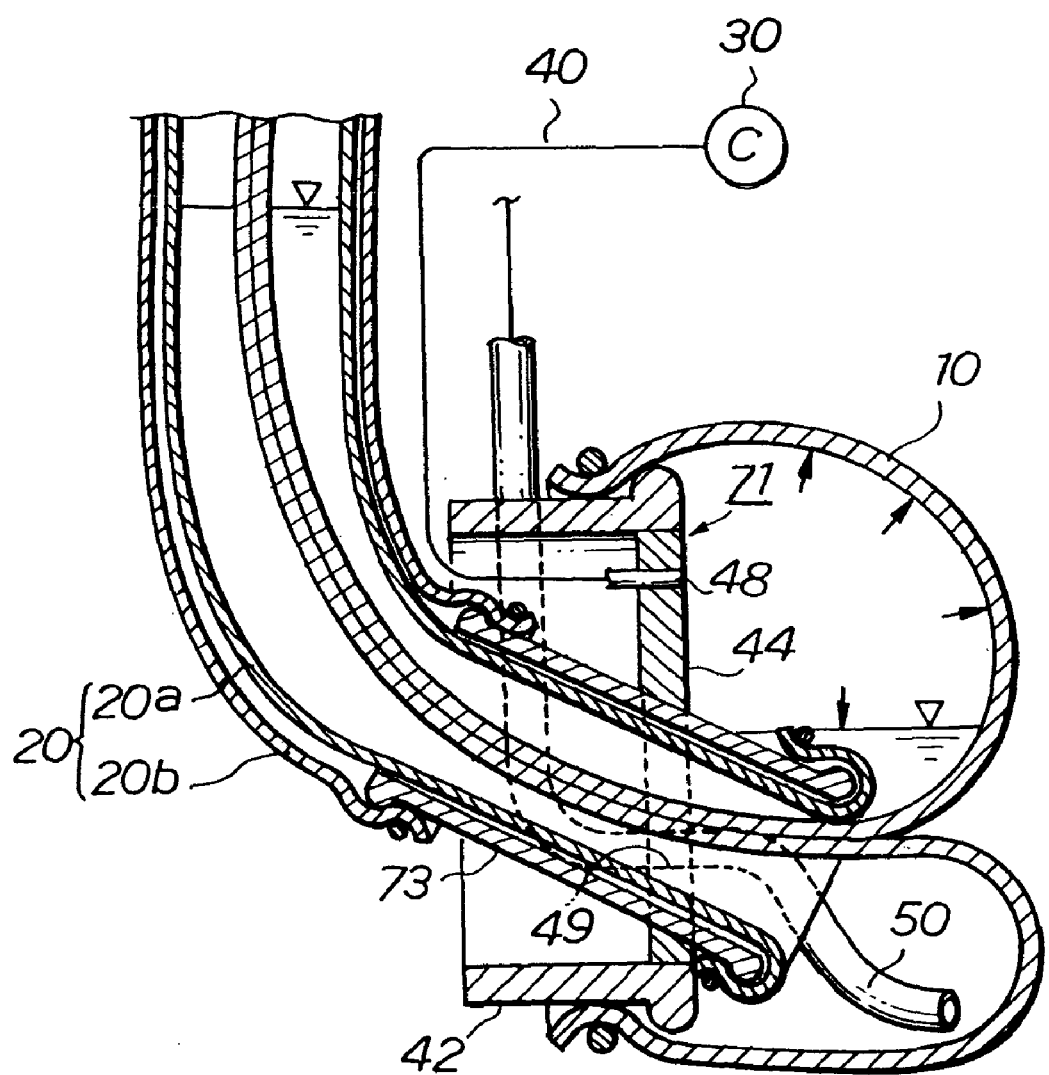

FIG. 18 is a cross-sectional view of the everting nozzle 71 according to the eighth embodiment which differs from the everting nozzle 51 illustrated in FIG. 16 in that a guide tube fixing nozzle 73 is inserted obliquely through and secured to a closer plate 44. The rest of the structure is identical to that of the everting nozzle 51 illustrated in FIG. 16. Therefore, components in FIG. 18 identical to those in FIG. 16 are designated the same reference numerals.

Next, an everting nozzle 81 according to a ninth embodiment of the present invention will be described for the structure with reference to FIG. 19.

Figure 19:
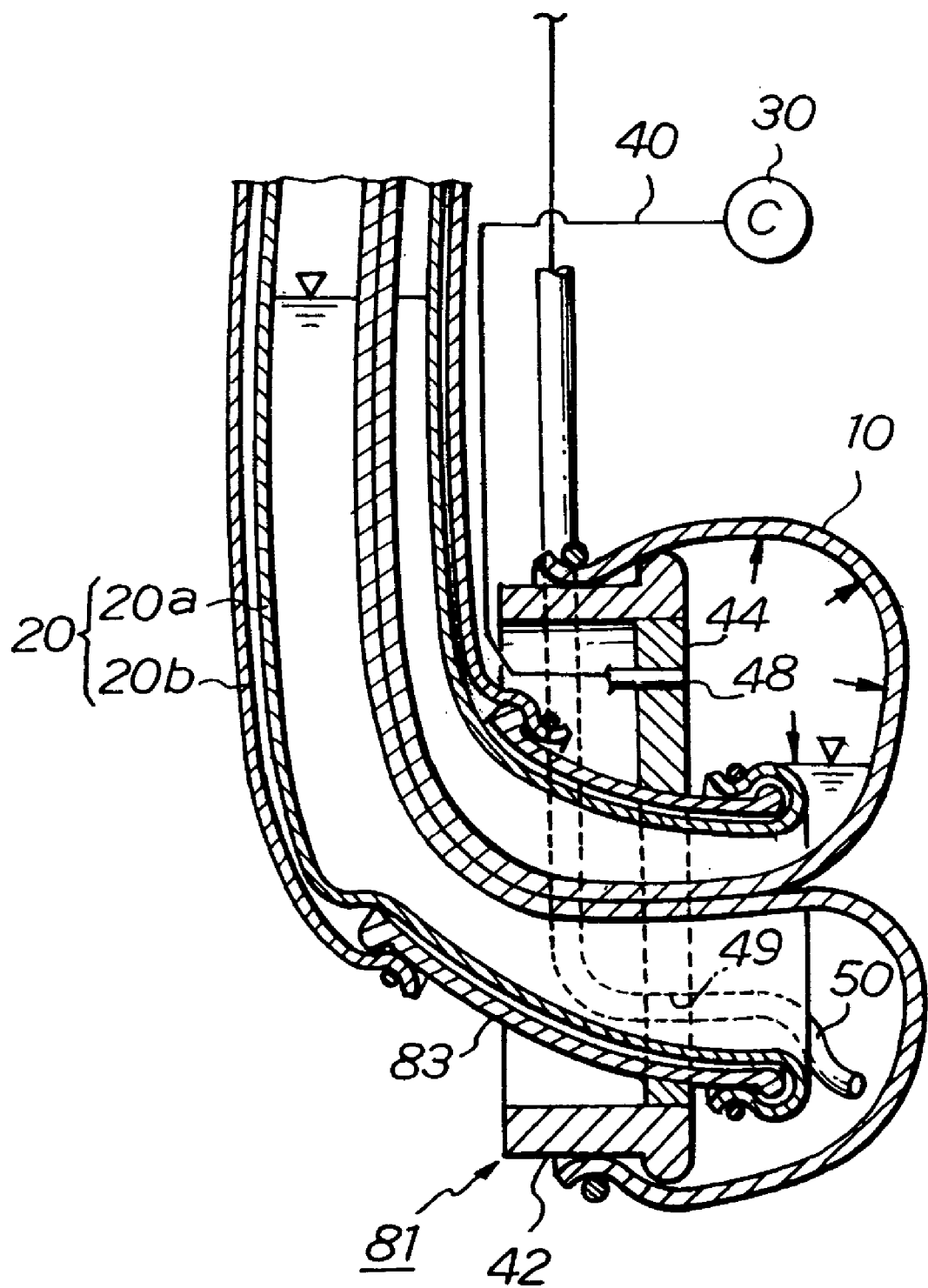

FIG. 19 is a cross-sectional view of the everting nozzle 81 according to the ninth embodiment which differs from the everting nozzle 51 illustrated in FIG. 16 in that the guide tube fixing nozzle 53 is replaced with a guide tube fixing nozzle 83 of 30° elbow type. The rest of the structure is identical to that of the everting nozzle 51 illustrated in FIG. 16. Therefore, components in FIG. 19 identical to those in FIG. 16 are designated the same reference numerals.

Next, an everting nozzle 91 according to a tenth embodiment of the present invention will be described for the structure with reference to FIG. 20.

Figure 20:
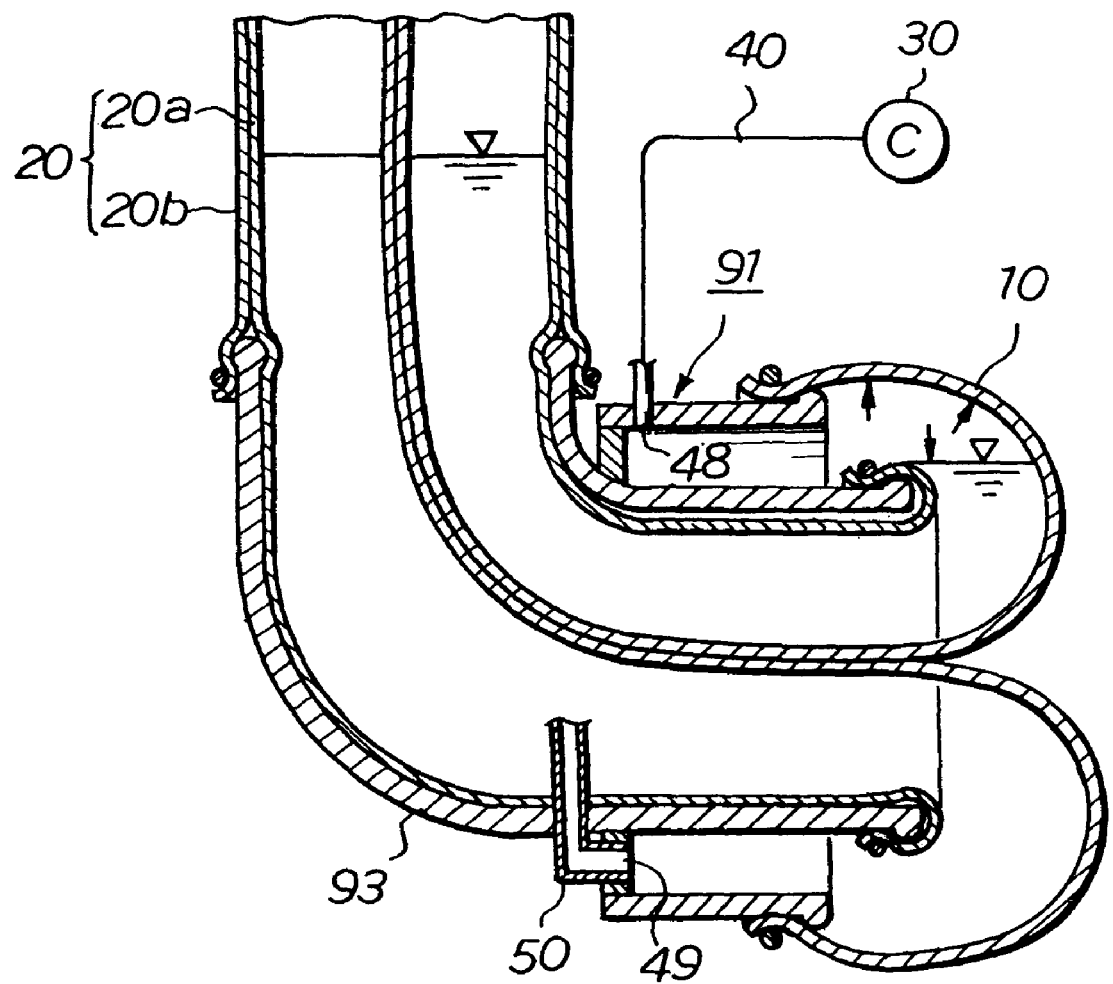

FIG. 20 is a cross-sectional view of the everting nozzle 91 according to the tenth embodiment which differs from the everting nozzle 81 illustrated in FIG. 19 in that the guide tube fixing nozzle 83 is replaced by a guide tube fixing nozzle 92 of 90° elbow type. The rest of the structure is identical to that of the everting nozzle 81 illustrated in FIG. 19. Therefore, components in FIG. 20 identical to those in FIG. 19 are designated the same reference numerals.

Next, an everting nozzle 101 according to an eleventh embodiment of the present invention will be described for the structure with reference to FIGS. 21 and 22.

Figure 21:
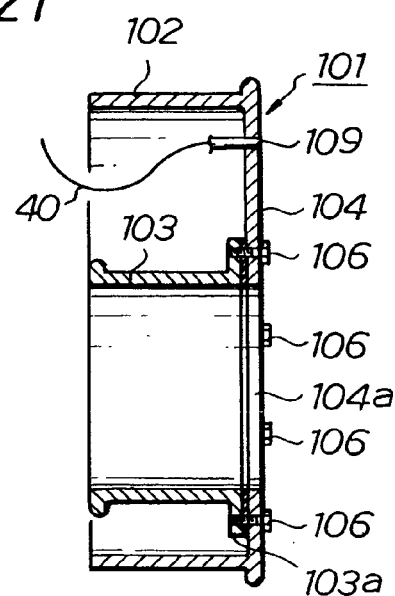
Figure 22:
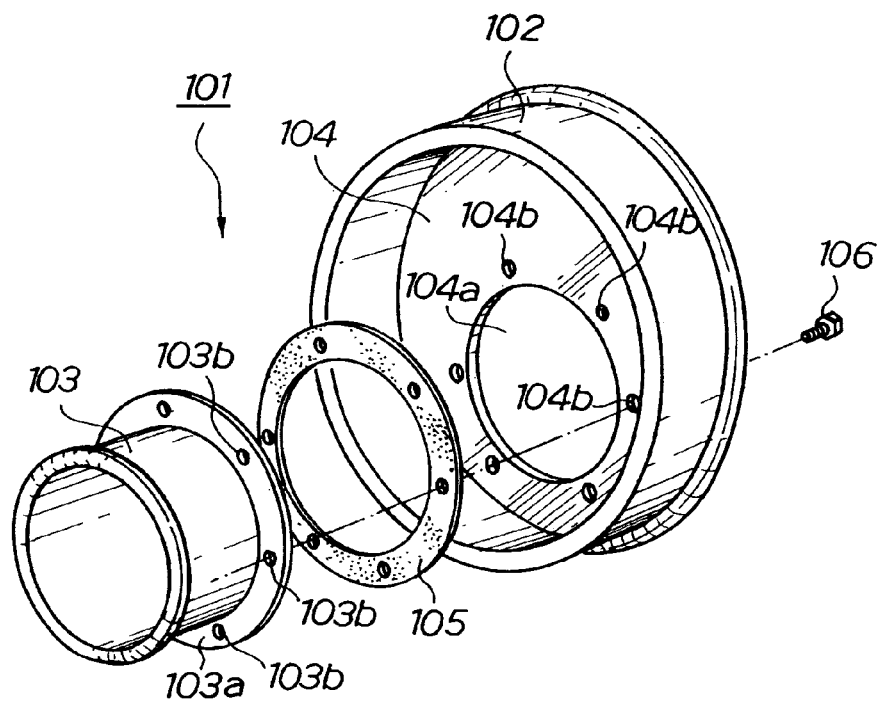

FIG. 21 is a cross-sectional view of the everting nozzle 101 according to the eleventh embodiment, and FIG. 22 is a exploded perspective view of the everting nozzle 101. In the everting nozzle 101, a pipe liner bag fixing nozzle 102 is integrated with a closer plate 104, and the closer plate 104 is formed with a circular hole 104a. Around the circular hole 104a of the closer plate 104, a guide tube fixing nozzle 103 is removably attached with a plurality of bolts 106.

Specifically, the guide tube fixing nozzle 103 is formed with a flange 103a around the outer periphery of one end thereof, and the flange 103a is formed with a plurality (six in the illustrated example) of tap holes 103b, as illustrated. Also, the same number (six) of bolt throughholes 104b as the tap holes 103b are formed around the circular hole 104a of the closer plate 104.

The guide tube fixing nozzle 103 is removably attached to the closer plate 104 by pressing the flange 103a of the guide tube fixing nozzle 103 onto the surrounding of the circular hole 104a of the closer plate 104 with a packing sandwiched therebetween, and screwing the bolts 106 extending through the bolt throughholes 104b formed through the closer plate 104 into the tap holes 103b formed through the flange 103a.

Then, in the everting nozzle 101, one end of a guide tube, not shown, is attached to the outer periphery of one end of a guide tube fixing nozzle 103, while a pipe liner bag, not shown, is passed through the guide tube, guide tube fixing nozzle 103 and circular hole 104a. A portion of the pipe liner bag, which extends outward from the everting nozzle 101, is folded out, and attached to the outer periphery of the open end of the pipe liner bag fixing nozzle 102.

In addition, the closer plate 104 of the everting nozzle 101 is formed with a compressed air supply port 109 in an upper portion of the closer plate 104, and with a drain port 49 in a lower portion of the same. An air hose 40 from a compressor, not shown, installed on the ground is connected to the compressed air supply port 109.

Next, an everting nozzle 111 according to twelfth embodiment of the present invention will be described for the structure with reference to FIGS. 23 through 25.

Figure 23:
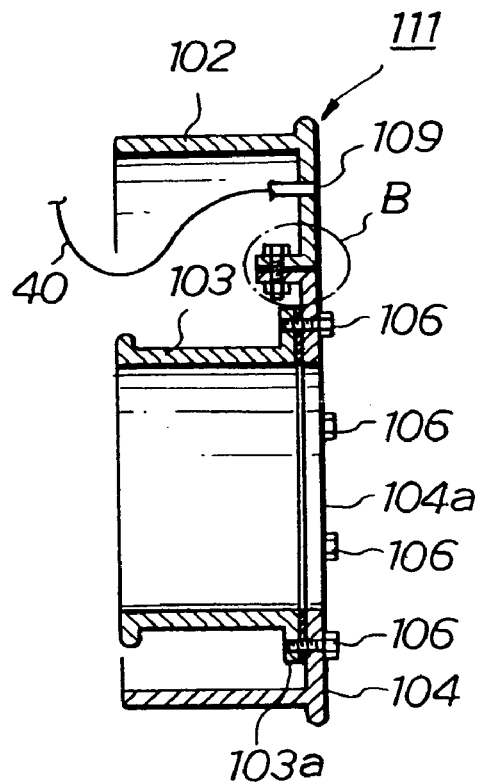
Figure 24:
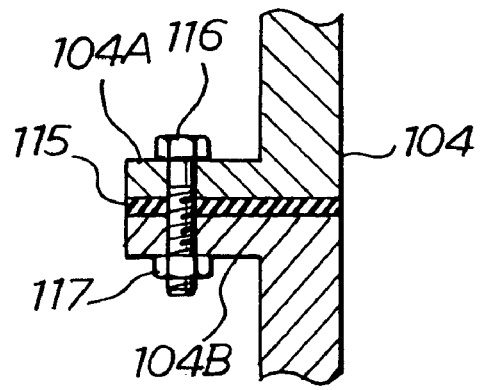
FIG. 24 is an enlarged view illustrating a portion B in FIG. 23 in greater detail.
Figure 25:
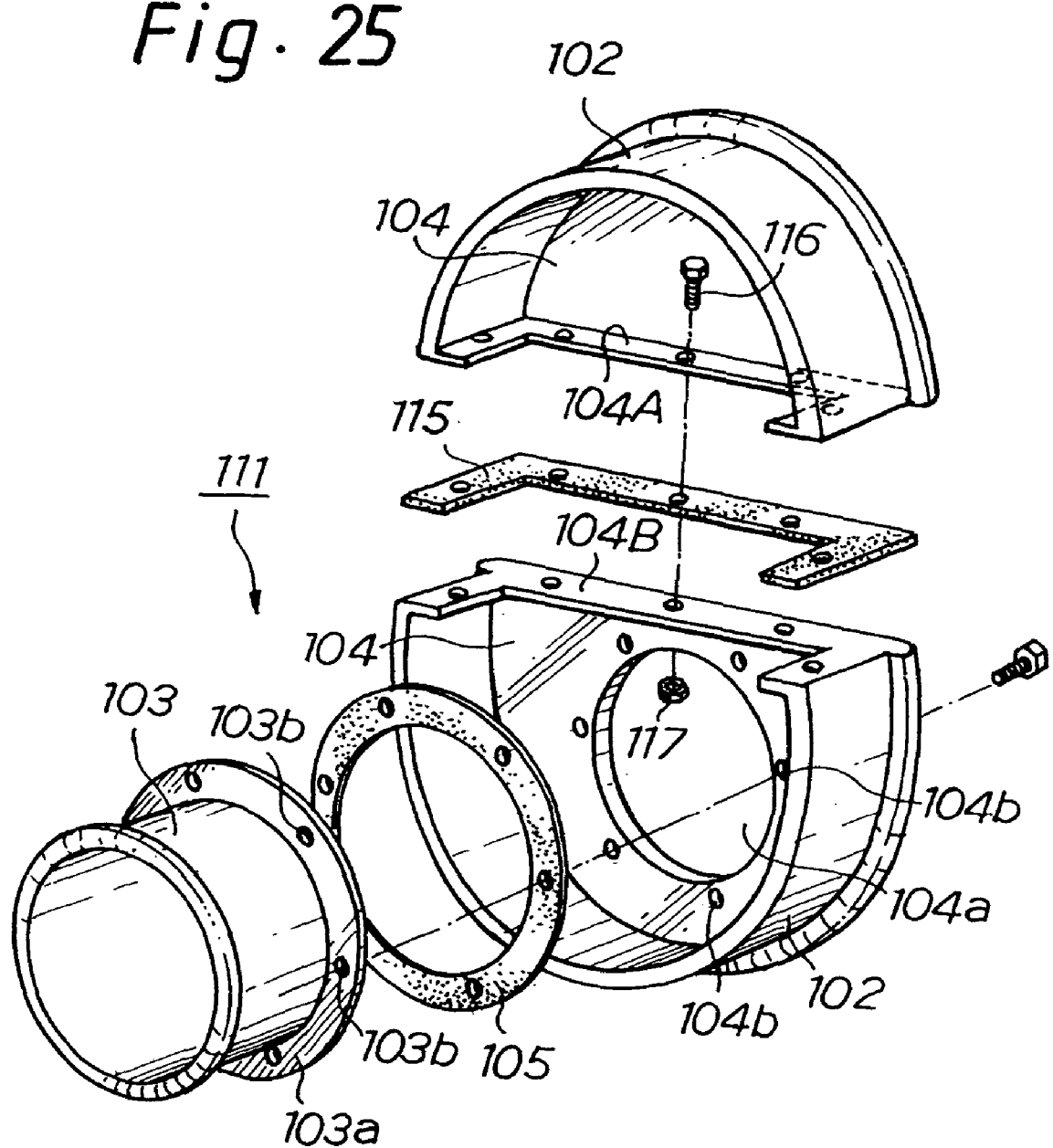
FIG. 25 is a exploded perspective view of the pipe liner bag everting nozzle illustrated in FIG. 23.

FIG. 23 is a cross-sectional view of the everting nozzle 111 according to the twelfth embodiment of the present invention, FIG. 24 is an enlarged view illustrating a portion B in FIG. 23 in greater detail, and FIG. 25 is an exploded perspective view of the everting nozzle 111. The everting nozzle 111 differs from the everting nozzle 101 of the eleventh embodiment in that a pipe liner bag fixing nozzle 102 and a closer plate 104 are made divisible from each other. The rest of the structure is identical to that of the everting nozzle 101 illustrated in FIG. 22. Therefore, components in FIGS. 23 through 25 identical to those in FIG. 22 are designated the same reference numerals, and description thereon is omitted.

In the everting nozzle 111 of the twelfth embodiment, the pipe liner bag fixing nozzle 102 and the closer plate 104 are divided vertically into two by a horizontal division line. The two components are joined with a packing 115 interposed therebetween, as illustrated in FIG. 24, and integrated with a plurality of bolts 116 inserted through flanges 104A, 104B and nuts 117 in screw engagement with the bolts 116.

Next, a pipe lining method, which is operated using the everting nozzle 41 illustrated in FIG. 15 in the second aspect of the present invention, will be described with reference to FIGS. 26 through 29. FIGS. 26 through 29 are cross-sectional views illustrating in order steps of the pipe lining method according to the second aspect of the present invention.

Figure 26:
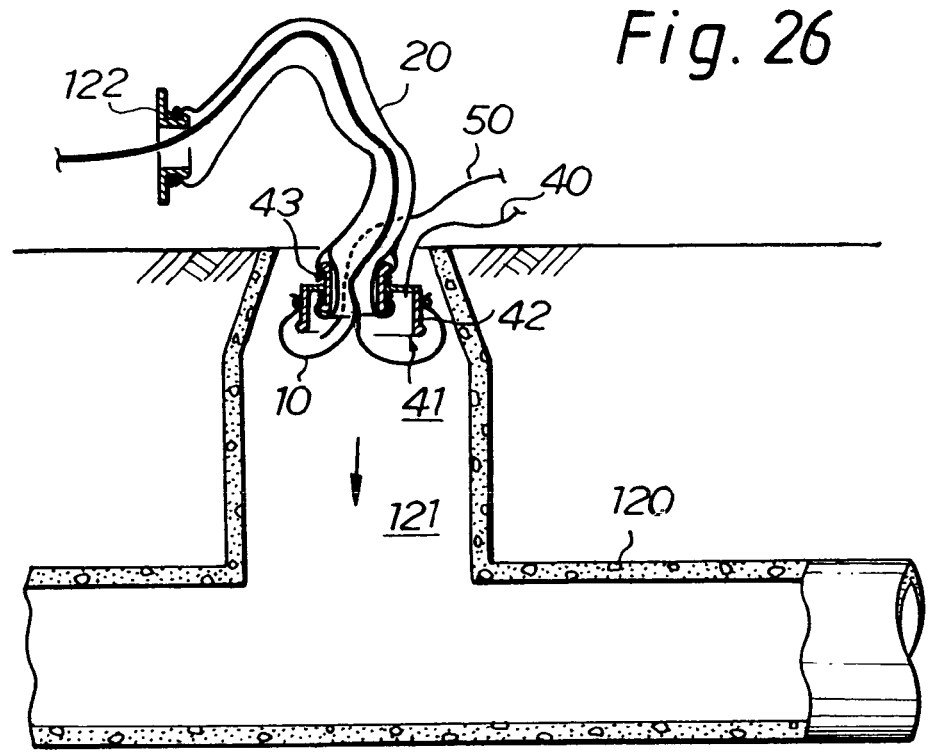
FIG. 26 is a cross-sectional view illustrating a step of inserting the pipe liner bag everting nozzle into a manhole in a pipe lining method according to an embodiment of the present invention.

Referring first to FIG. 26, a pipe line 120 such as a sewage pipe is embedded in the ground, and is connected to a manhole 121 which is open to the ground.

For lining the pipe line 120, the everting nozzle 41 is introduced into the manhole 121 with the pipe liner bag fixing nozzle 42 oriented downward, as illustrated in FIG. 26. In this event, one end of the guide tube 20 is attached to the outer periphery of the guide tube fixing nozzle 43 of the everting nozzle 41. A folded end of a pipe liner bag 10 is attached to the outer periphery of the pipe liner bag fixing nozzle 42. A drain hose 50 is inserted through the drain port 49 (see FIG. 15), and a compressed air hose 40 is attached to the compressed air intake port 48. Also, a top nozzle 122 is attached to the other end of the guide tube 20.

As described above, in the everting nozzle 41, the guide tube fixing nozzle 43 does not protrude outward from the pipe liner bag fixing nozzle 42 in the radial direction, so that the guide tube fixing nozzle 43 will not be any impediment when the everting nozzle 41 is introduced into the manhole 121. Therefore, the everting nozzle 41 is readily passed through the opening of the manhole 121 having a larger diameter than that of the pipe liner bag fixing nozzle 42 for introduction into a pipe line through the manhole 121.

Here, the pipe liner bag 10 is comprised of a tubular unwoven fabric such as polyester, vinylon, acrylic or the like impregnated with an unhardened hardenable liquid resin, and a highly air thigh plastic film coated over the tubular unwoven fabric. For the unhardened hardenable liquid resin impregnated in the tubular unwoven fabric may be any of thermosetting resins such as unsaturated polyester resin, vinylester resin, epoxy resin, and so on.

Figure 27:
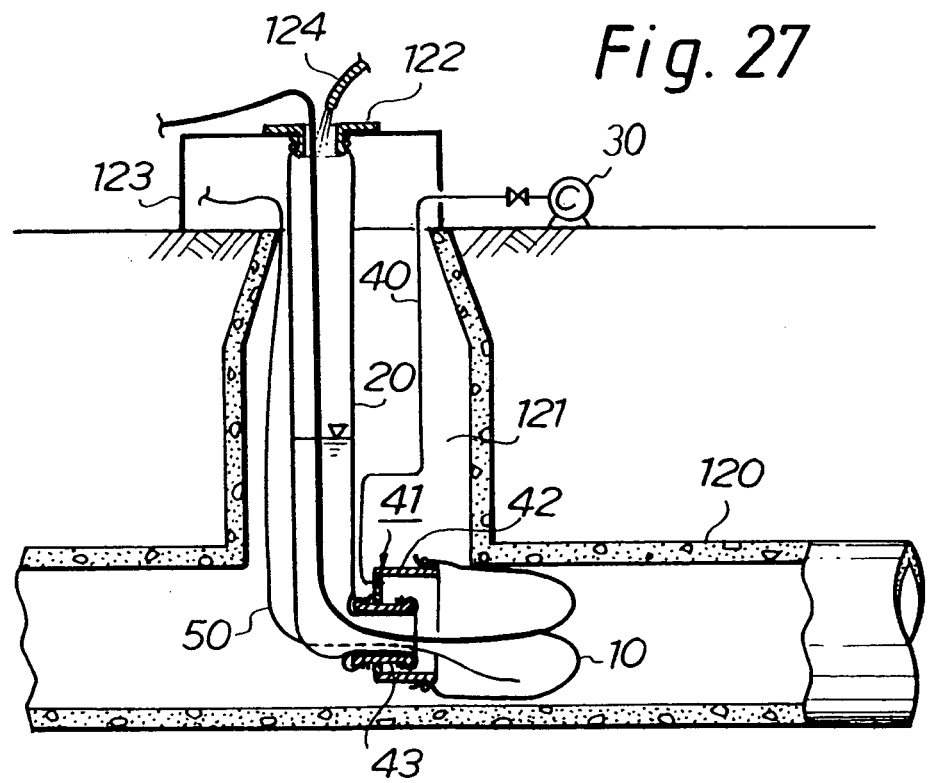
FIG. 27 is a cross-sectional view illustrating a step of everting a pipe liner bag in the pipe lining method according to the embodiment of the present invention.

Then, as illustrated in FIG. 27, the everting nozzle 41 is set at a position on the bottom of the manhole 121, which is 10 to 60 cm away from the opening of the pipe line 120, substantially parallel to the pipe way 120. In the state set in this manner, the pipe liner bag fixing nozzle 42 opposes the pipe line 120, the guide tube fixing nozzle 43 is open on the opposite side of the pipe line 120 in the horizontal direction, the guide tube 20 having one end (lower end) fixed to the guide tube fixing nozzle 43 extends in the manhole 121 vertically toward the ground, and the top nozzle 122 attached to the upper end of the guide tube 20 is set on and supported by a base 123 installed on the ground.

Also, the drain hose 50 and the air hose 40 connected to the everting nozzle 41 also extend through the manhole 121 to the ground, and the air hose 40 is connected to a compressor 30 installed on the ground.

Subsequently, as water is poured into the guide tube 20 through a water supply hose 124 from the opening of the guide tube 20 attached to the top nozzle 122 as illustrated in FIG. 27, the pipe liner bag 10 is inserted into the pipe line 120 as it is everted with the water pressure. Then, after the pipe liner bag 10 has been inserted into the pipe line 120 over a predetermined length, a pressurized space S' sealed by the water is formed within the pipe liner bag 10 and the everting nozzle 41, as illustrated in FIG. 28.

Figure 28:
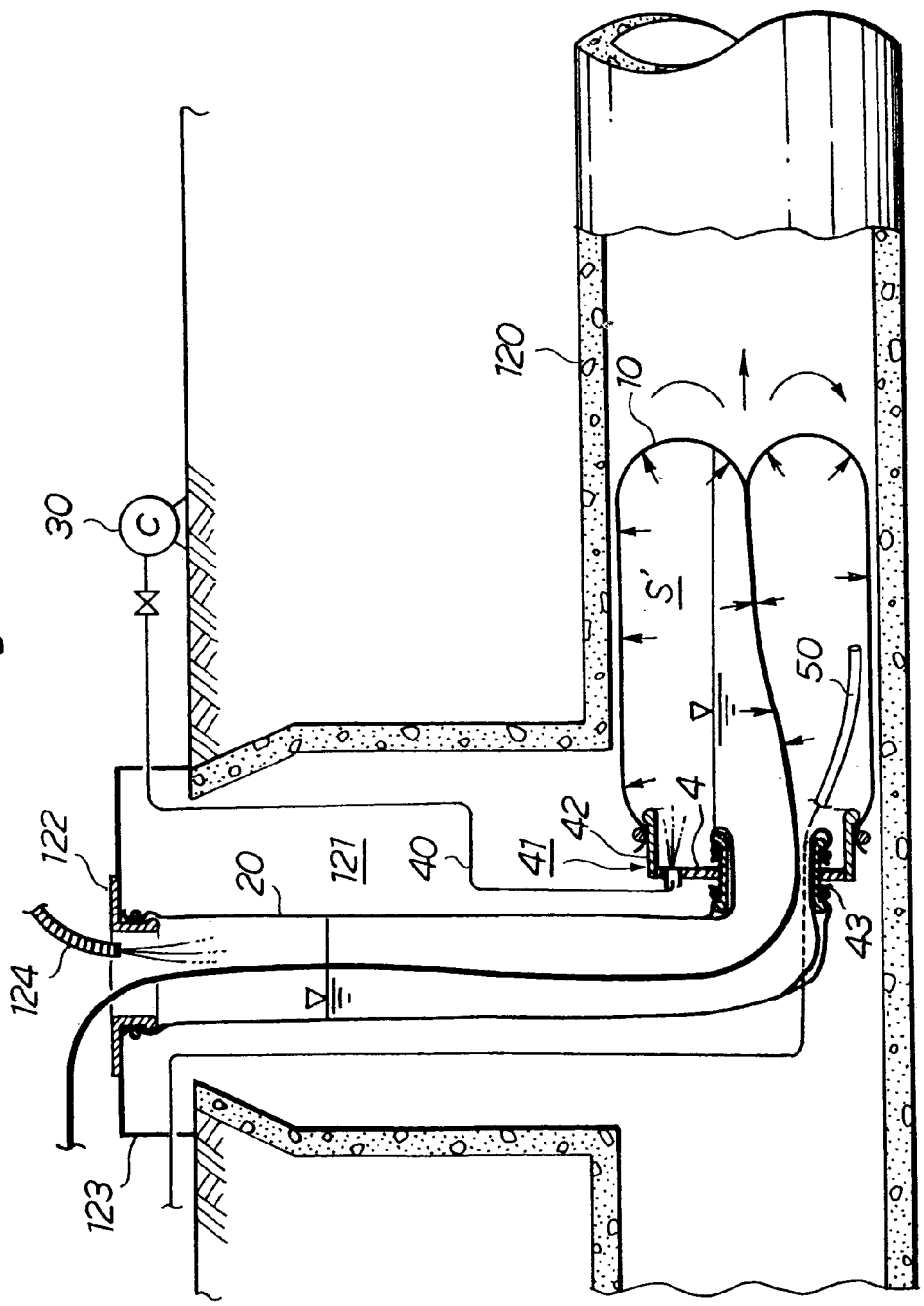
FIG. 28 is a cross-sectional view illustrating a step of everting a pipe liner bag in the pipe lining method according to the embodiment of the present invention.

Then, in the state illustrated in FIG. 28, as the compressor 30 is driven to supply compressed air into the pressurized space S' through the air hose 40, the pipe liner bag 10 is sequentially inserted into the pipe line 120 as it is turned inside out with the pressure of the compressed air. As the pipe liner bag 10 has been inserted into the pipe line 120, the tubular unwoven fabric impregnated with a thermosetting resin of the pipe liner bag 10 is pressed onto the inner wall surface of the pipe line 120, so that the inner surface of the unwoven fabric is covered with the plastic film.

Figure 29:
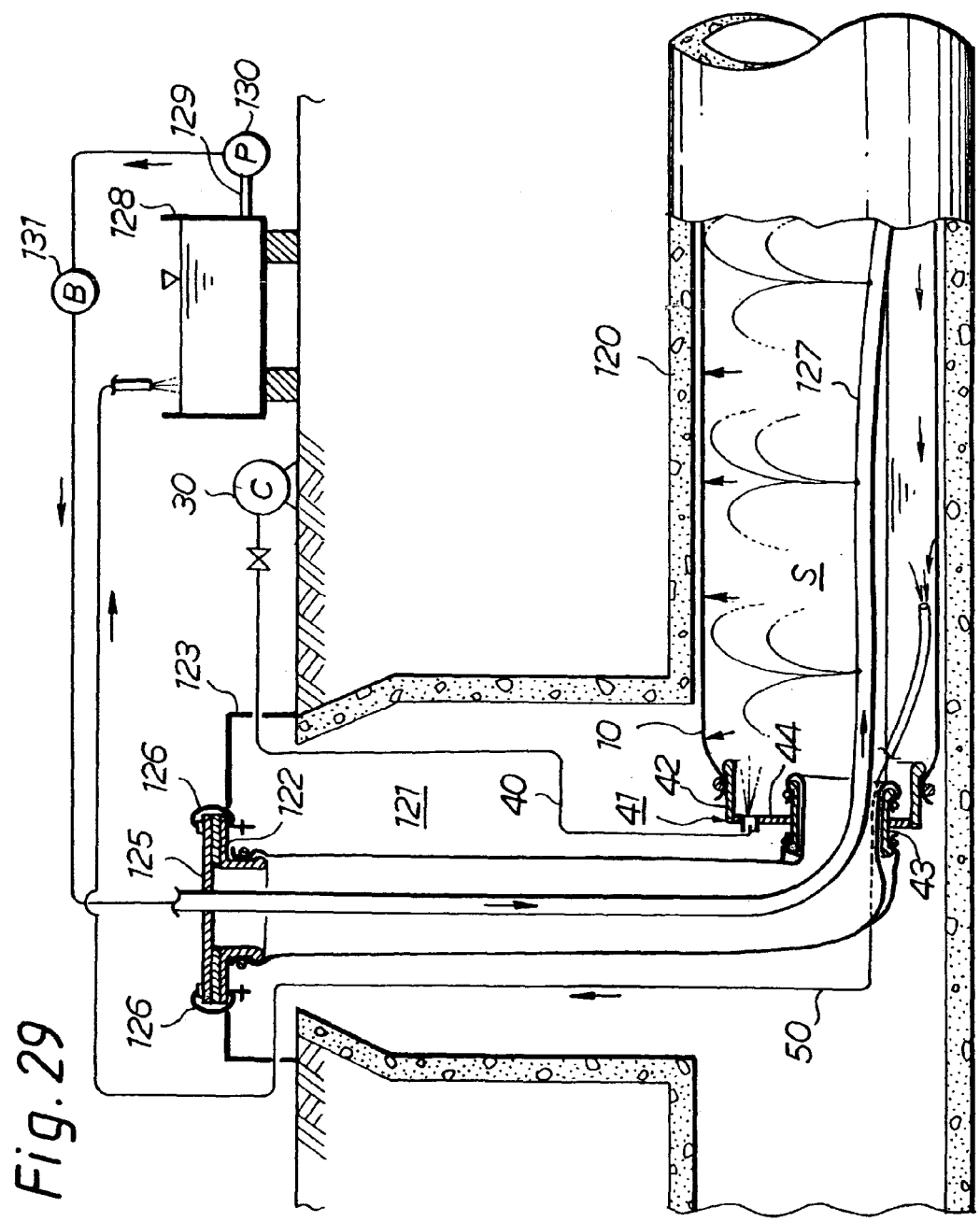
FIG. 29 is a cross-sectional view illustrating a step of hardening the pipe liner bag in the pipe lining method according to the embodiment of the present invention.
Figure 30:
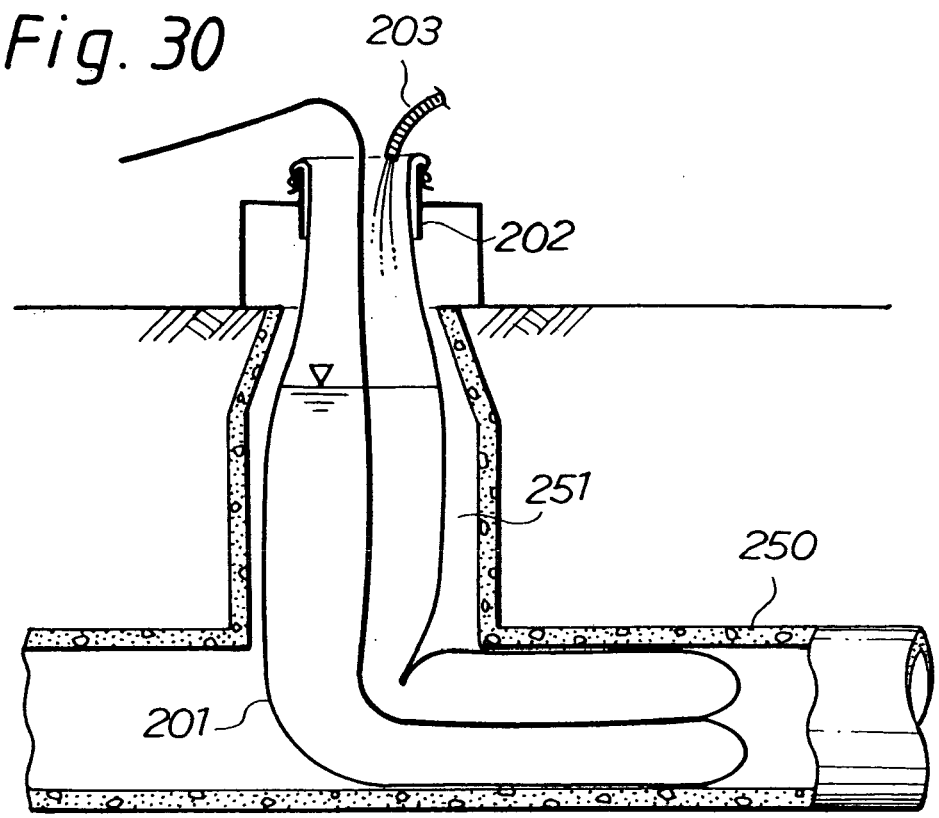
FIG. 30 is a cross-sectional view illustrating a step of everting a pipe liner bag in a pipe lining method using a conventional pipe liner bag everting nozzle.
Figure 31:
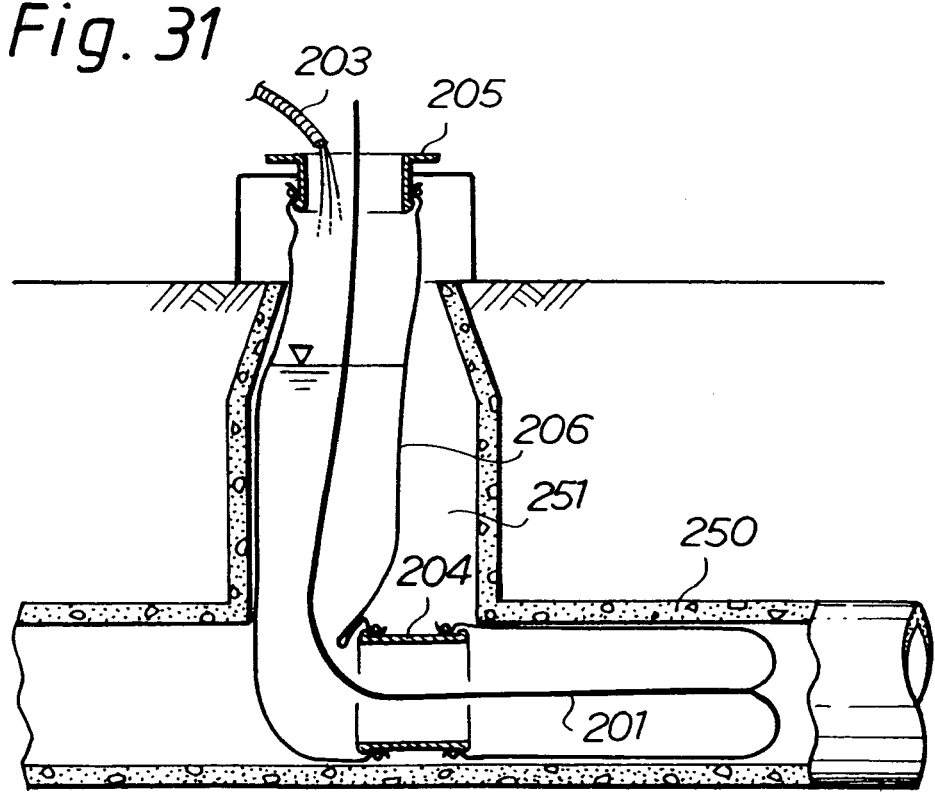
FIG. 31 is a cross-sectional view illustrating a step of everting a pipe liner bag in another pipe lining method using a conventional pipe liner bag everting nozzle.
Figure 32:
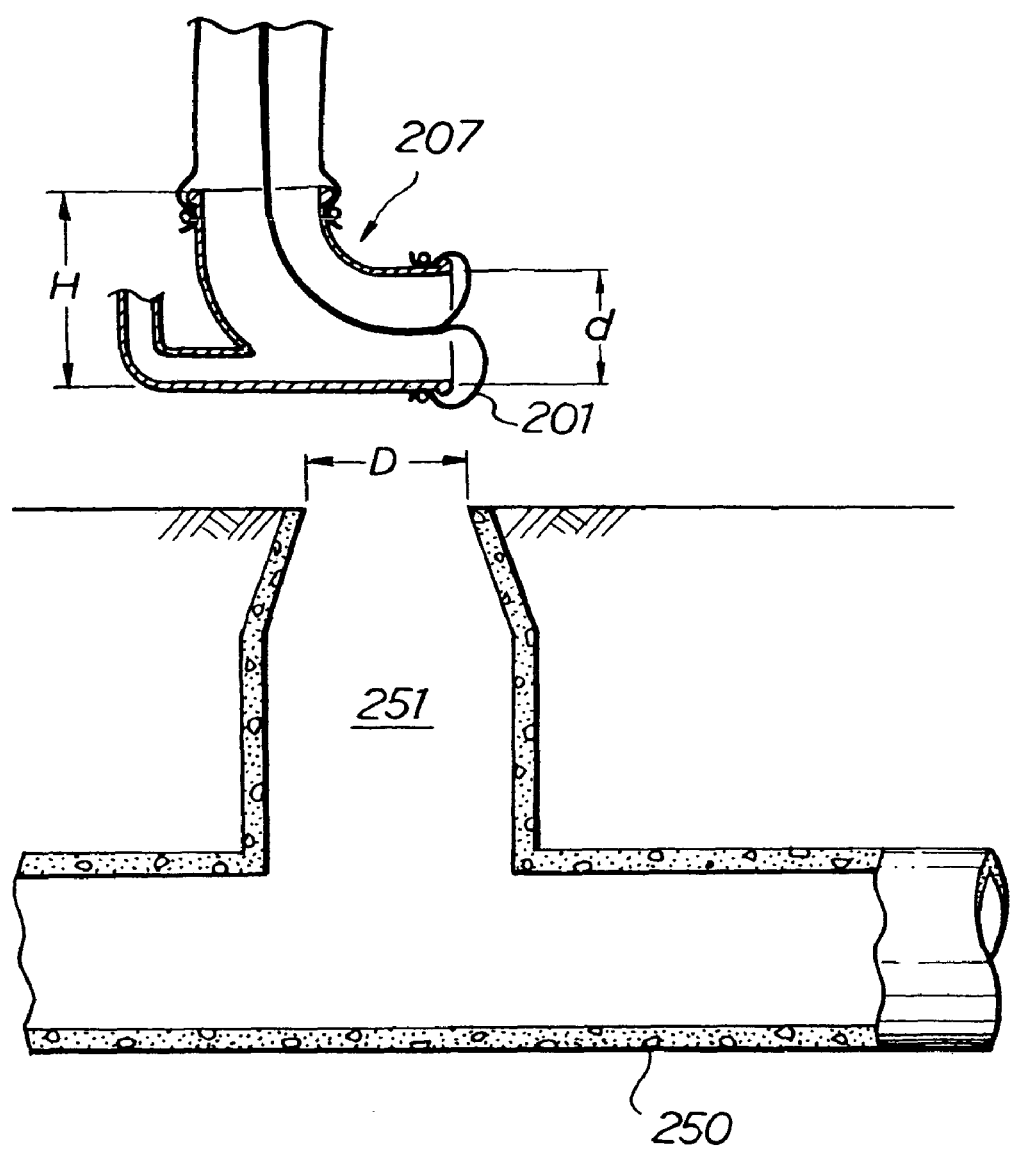
FIG. 32 is a cross-sectional view illustrating a step of everting a pipe liner bag in another pipe lining method using a conventional pipe liner bag everting nozzle.

Consequently, when the pipe liner bag 10 has been inserted into the pipe line 120 over its entire length as illustrated in FIG. 29, a closing cap 125 is mounted at the top of the top nozzle 122 in an air tight structure by a plurality of G clamps 126, so that a sealed space S is formed internally by the top sealing lid 125 and the pipe liner bag 10. The air hose 40 from the compressor 30 is connected to the closing cap 125.

When the pipe liner bag 10 is everted into the pipe line 120 as described above, a hot water hose 127 attached to an end of the pipe liner bag 10 is drawn into the pipe liner bag, and extends through the closing cap 125 in an air tight manner and out of the sealed space S. A portion of the hot water hose 127, which is positioned in the sealed space S, is formed with a plurality of hot water pour ports, not shown.

Also, the drain hose 50 extends through the closing cap 125 in an air tight manner and lies in the sealed space S. The drain hose 50 has one end open to the bottom of the pipe liner bag 10, and the other end, which extends out of the sealed space S, open above a hot water tank 128 installed on the ground.

The hot water tank 128 stores hot water, and a hot water pipe 129 from a side wall of the hot water tank 128 is connected to an intake side of the hot water pump 130, the discharge side of which is connected to the hot water hose 127. A boiler 131 is provided in the middle of the hot water hose 127.

In the state illustrated in FIG. 29, as the compressor 30 is driven to supply compressed air from the air hose 40 to the sealed space S, the pipe liner bag 10 is inflated with the pressure of the compressed air and pressed onto the inner wall of the pipe line 120, as illustrated. Then, with the pipe liner bag 10 kept pressed onto the inner wall of the pipe line 120, the pipe liner bag 10 is heated to harden the thermosetting resin impregnated therein. This hardening operation is performed in the following manner.

Specifically, as the hot water pump 130 and the boiler 131 are driven to heat hot water in the hot water tank 128 to a predetermined temperature, the hot water is fed into the hot water hose 127 and poured from the plurality of hot water pour ports, formed through the hot water hose 127 at proper intervals in the longitudinal direction, into the pipe liner bag 10, as illustrated, to serve for heating the pipe liner bag 10. Cooled hot water, after serving to heat the pipe liner bag 10 stays on the bottom of the pipe liner bag 10. Such hot water staying on the bottom of the pipe liner bag 10 is delivered to the drain hose 50 by the action of the inner pressure of the sealed space S, and returned to the hot water tank 128 through the drain hose 50.

Subsequently, the hot water is circulated in a similar manner to the foregoing to heat the pipe liner bag 10 with the hot water, thereby causing the thermosetting resin impregnated in the pipe liner bag 10 to harden. Consequently, the pipe line 120 is lined with the hardened pipe liner bag 10 and thus repaired.

In the foregoing process, the everting nozzle 41 for use in the pipe lining method according to the present invention is designed such that the guide tube fixing nozzle 43 has the diameter D1 smaller than the diameter D2 of the pipe liner bag fixing nozzle 42, so that the guide tube 20 having a smaller diameter than that of the pipe line 120 (or the pipe liner bag 10) can be used. As a result, a sufficient gap is formed between the guide tube 20 and the manhole 121, thus allowing the operator to freely access the manhole 121 during the lining operation for inspection and confirmation of a lining situation and so on.

Also, according to the pipe lining method of the present invention, the pipe liner bag 10 is everted using the guide tube 20, so that the pipe liner bag 10 need not be drawn out to the ground through the manhole 121, thereby eliminating a portion of the pipe liner bag which is not used for lining and wasted to improve the economies of the pipe lining method.

It should be understood that while the foregoing description has been made particularly on the pipe lining method using the everting nozzle 41 illustrated in FIG. 15, similar advantages are provided as well when the pipe lining is operated using any of the everting nozzles 51, 61, 71, 81, 91, 101, 111 illustrated in FIGS. 16 through 25.

As is apparent from the foregoing description, the pipe liner bag everting nozzle in the first aspect is designed such that the guide tube fixing end has the diameter smaller than the diameter of the pipe liner bag fixing end, while the pipe liner bag everting nozzle in the second aspect is designed such that the guide tube fixing nozzle has the diameter smaller than the diameter of the pipe liner bag fixing nozzle, so that a guide tube having a smaller diameter than that of a pipe line to be repaired (or the pipe liner bag) can be used. Since a sufficient gap is formed between the guide tube and the manhole, the operator can freely access the manhole during the lining operation for inspection and confirmation of a lining situation and so on.

Also, according to the pipe lining methods of the present invention, the pipe liner bag is everted using the guide tube, so that the pipe liner bag need not be drawn out to the ground through the manhole, thereby eliminating a portion of the pipe liner bag which is not used for lining and wasted to improve the economies of the pipe lining method.

While the present invention has been described in connection with its preferred embodiments, it is to be understood that various modifications will occur to those skilled in the art without departing from the spirit of the invention. The scope of the present invention is therefore to be determined solely by the appended claims.

What is claimed is:

1. A pipe liner bag everting device comprising a generally tubular body, the tubular body defining a first end configured to be coupled with one end of a guide tube and a second end configured to be coupled with a folded end of an uneverted pipe liner bag, the first end having a diameter smaller than a diameter of the second end, the tubular body comprising at least first and second members unitarily coupled with each other, the first member defining the first end, and the second member defining the second end.

2. The pipe liner bag everting device according to claim 1, wherein the tubular body additionally comprises a third member connecting the first and second members to each other.

3. The pipe liner bag everting device according to claim 1, wherein the first member defines at least the first end and a third end, the third end is configured to couple to a second guide tube.

4. The pipe liner bag everting device according to claim 3, wherein the tubular body additionally comprises a third member connecting the first and second members to each other, and the first end and the third end are positioned on opposite sides of the third member.

5. The pipe liner bag everting device according to claim 1, wherein the second member generally encloses the first member.

6. The pipe liner bag everting device according to claim 1, wherein the second member comprises first and second pieces, and the first member is connected to the second piece.

\* \* \* \* \*